(12) United States Patent
Sekizuka et al.

(10) Patent No.: US 11,628,801 B2
(45) Date of Patent: Apr. 18, 2023

(54) WHEELCHAIR SECURING STRUCTURE

(71) Applicant: Toyota Jidosha Kabushiki Kaisha, Toyota (JP)

(72) Inventors: Makoto Sekizuka, Toyota (JP); Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 334 days.

(21) Appl. No.: 16/902,647

(22) Filed: Jun. 16, 2020

(65) Prior Publication Data
US 2021/0053528 A1 Feb. 25, 2021

(30) Foreign Application Priority Data
Aug. 23, 2019 (JP) .............................. JP2019-153067

(51) Int. Cl.
*B60R 22/24* (2006.01)
*A61G 3/08* (2006.01)
*B60R 22/48* (2006.01)

(52) U.S. Cl.
CPC ............ *B60R 22/24* (2013.01); *A61G 3/0808* (2013.01); *A61G 2203/30* (2013.01); *A61G 2220/14* (2013.01); *B60R 2022/4816* (2013.01); *B60R 2022/4866* (2013.01)

(58) Field of Classification Search
None
See application file for complete search history.

(56) References Cited

U.S. PATENT DOCUMENTS

| | | | |
|---|---|---|---|
| 7,229,238 B2 * | 6/2007 | Girardin ................. | B60P 3/073 410/7 |
| 2007/0061068 A1 | 3/2007 | Okamoto et al. | |
| 2008/0079252 A1 * | 4/2008 | Shutter ................. | A61G 3/0808 280/755 |
| 2010/0086375 A1 * | 4/2010 | Tremblay .............. | A61G 3/0808 410/7 |
| 2010/0107121 A1 | 4/2010 | Kawachi | |
| 2011/0282543 A1 * | 11/2011 | Desmarais .............. | B60R 22/48 701/29.2 |
| 2013/0088348 A1 * | 4/2013 | Verachtert .............. | G08B 21/02 434/308 |
| 2017/0072903 A1 | 3/2017 | Farshchi et al. | |
| 2018/0236936 A1 * | 8/2018 | Cali ...................... | F02N 11/101 |

(Continued)

FOREIGN PATENT DOCUMENTS

| | | |
|---|---|---|
| CN | 101952141 A | 1/2011 |
| JP | H11-028226 A | 2/1999 |
| JP | 2001-047969 A | 2/2001 |

(Continued)

*Primary Examiner* — Daniel L Greene
(74) *Attorney, Agent, or Firm* — Dinsmore & Shohl LLP

(57) ABSTRACT

A wheelchair securing structure includes: a securing device provided in a wheelchair securing space inside a vehicle cabin, the securing device being configured to secure a wheelchair; a securing detection portion configured to detect that the wheelchair is secured by the securing device; and a display portion provided at a position where the display portion is visually recognizable by an occupant of the wheelchair from the wheelchair securing space inside the vehicle cabin, the display portion being configured to display a secured state of the wheelchair, the secured state being detected by the securing detection portion.

19 Claims, 18 Drawing Sheets

(56) References Cited

U.S. PATENT DOCUMENTS

2020/0262326 A1* 8/2020 Honda .................. B60N 2/002

FOREIGN PATENT DOCUMENTS

| | | |
|---|---|---|
| JP | 2001-071862 A | 3/2001 |
| JP | 2007-076381 A | 3/2007 |
| JP | 2009-132303 A | 6/2009 |
| JP | 2011-105157 A | 6/2011 |
| JP | 2012-095810 A | 5/2012 |
| JP | 2015-085068 A | 5/2015 |
| JP | 2015-130964 A | 7/2015 |
| JP | 2015-150071 A | 8/2015 |
| KR | 101857461 B1 | 5/2018 |

* cited by examiner

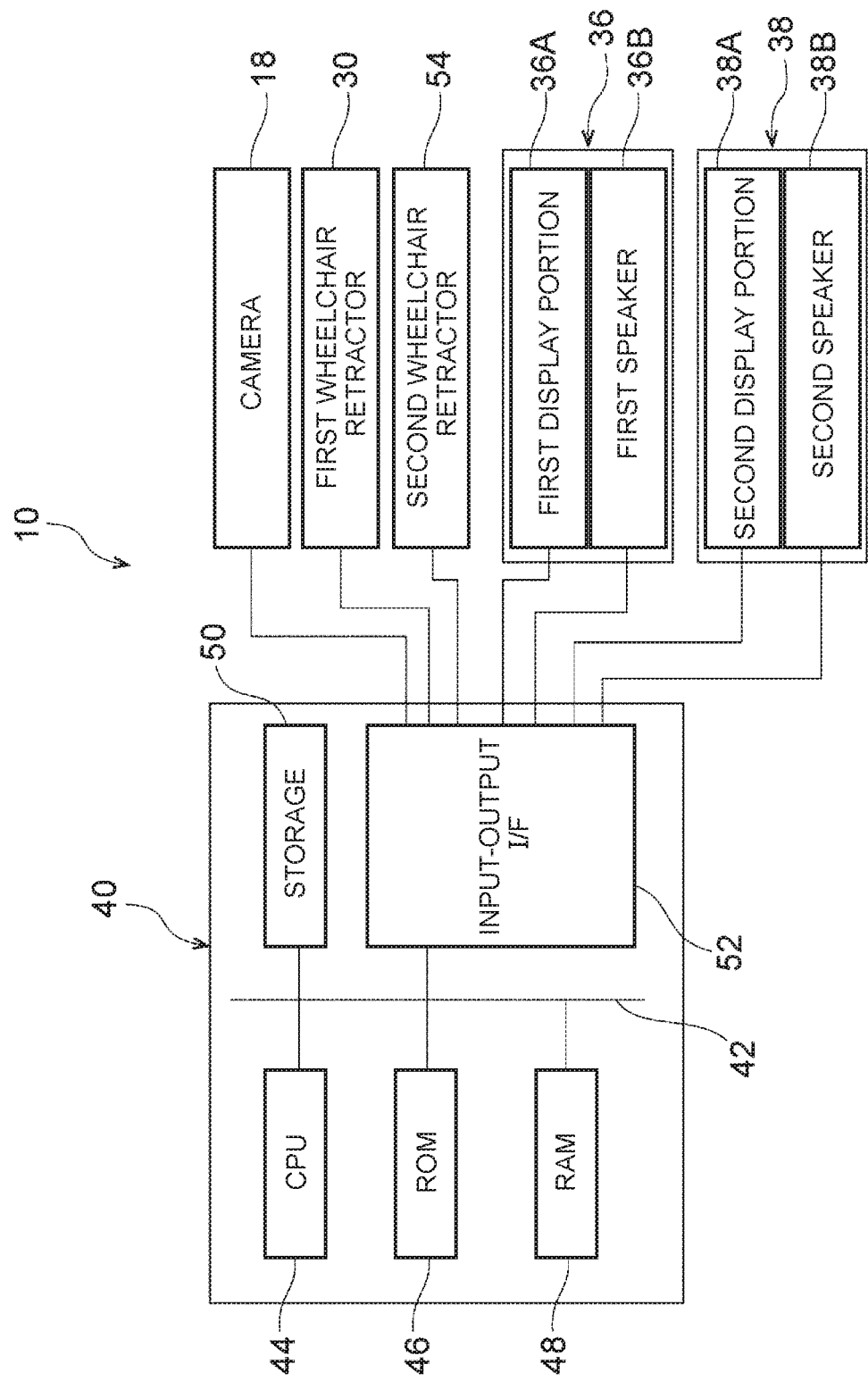

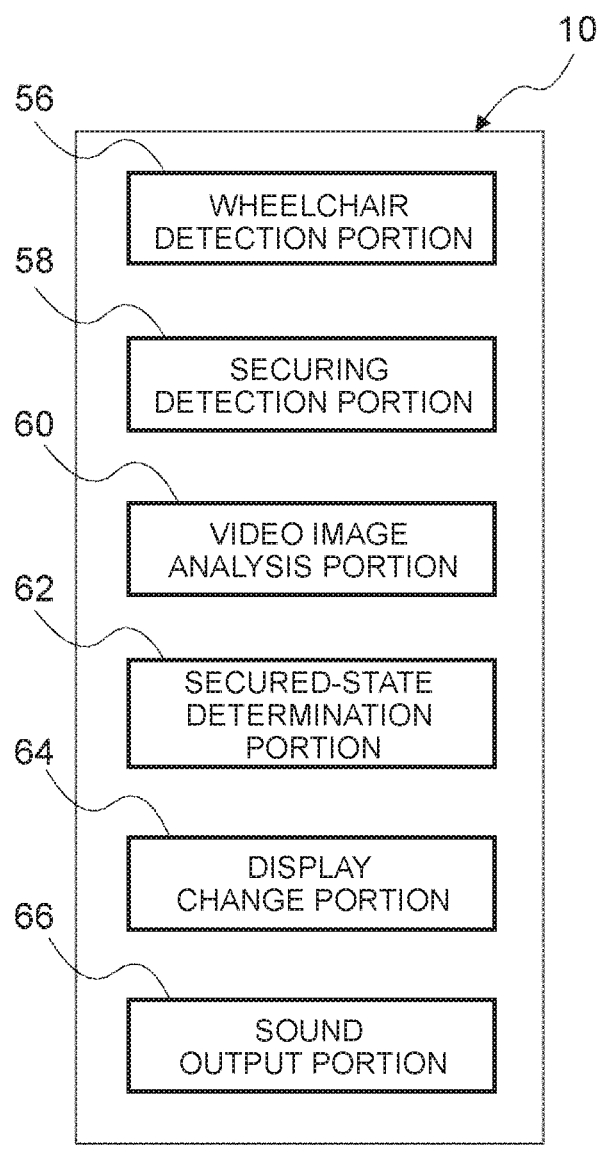

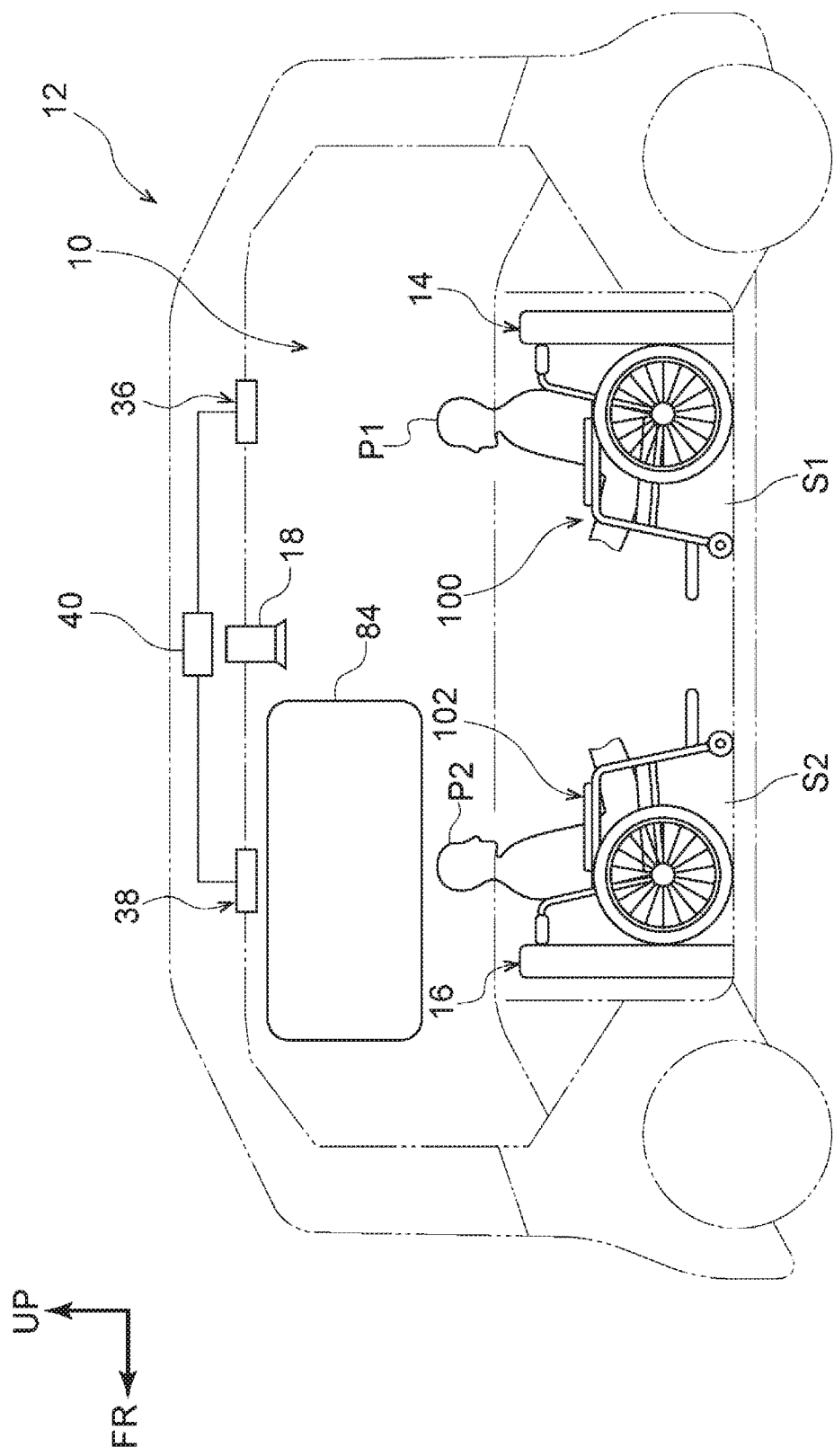

WHEELCHAIR SECURING STRUCTURE

CROSS-REFERENCE TO RELATED APPLICATIONS

This application claims priority to Japanese Patent Application No. 2019-153067 filed on Aug. 23, 2019, which is incorporated herein by reference in its entirety including the specification, drawings and abstract.

BACKGROUND

1. Technical Field

The present disclosure relates to a wheelchair securing structure.

2. Description of Related Art

Japanese Unexamined Patent Application Publication No. 2011-105157 (JP 2011-105157 A) describes, in terms of a structure in which a wearing detector configured to detect wearing of a seat belt is provided in each rear seat, a seat belt wearing warning device configured to perform a warning display when the wearing detector does not detect wearing of the seat belt by an occupant seated in the rear seat. In JP 2011-105157 A, a warning display portion is provided at a position where the warning display portion is visually recognizable by all occupants seated in the rear seats.

SUMMARY

However, the structure described in JP 2011-105157 A is provided on a premise that a physically unimpaired person is seated in the rear seat, and it is not considered that the structure is applied to a vehicle that a wheelchair can board. On this account, there is room for improvement to easily grasp a secured state of a wheelchair.

The present disclosure is achieved in consideration of the above fact, and an object of the present disclosure is to provide a wheelchair securing structure that allows an occupant of a wheelchair to easily grasp a secured state of the wheelchair in a vehicle that the wheelchair can board.

A wheelchair securing structure according to a first aspect includes a securing device, a securing detection portion, and a display portion. The securing device is provided in a wheelchair securing space inside a vehicle cabin, the securing device being configured to secure a wheelchair. The securing detection portion is configured to detect that the wheelchair is secured by the securing device. The display portion is provided at a position where the display portion is visually recognizable by an occupant of the wheelchair from the wheelchair securing space inside the vehicle cabin, the display portion being configured to display a secured state of the wheelchair, the secured state being detected by the securing detection portion.

The wheelchair securing structure according to the first aspect is configured such that, when the wheelchair is placed in the wheelchair securing space inside the vehicle cabin, the wheelchair can be secured by the securing device. Further, the securing detection portion detects that the wheelchair is secured by the securing device. Further, in the vehicle cabin, the display portion is provided at a position where the display portion is visually recognizable by the occupant of the wheelchair placed in the wheelchair securing space, and the secured state of the wheelchair is displayed on the display portion, the secured state being detected by the securing detection portion. This allows the occupant of the wheelchair to easily grasp the secured state of the wheelchair.

A wheelchair securing structure according to a second aspect is as follows. That is, in addition to the first aspect, the wheelchair securing structure may further include a restraint device provided in the wheelchair securing space, the restraint device being configured to restrain the occupant of the wheelchair to the wheelchair; and a restraint detection portion configured to detect that the occupant is restrained by the restraint device. A restrained state of the occupant, the restrained state being detected by the restraint detection portion, may be displayed on the display portion in addition to the secured state of the wheelchair, the secured state being detected by the securing detection portion.

In the wheelchair securing structure according to the second aspect, the restraint detection portion detects that the occupant is restrained to the wheelchair by the restraint device. Since the secured state of the wheelchair and the restrained state of the occupant are displayed on the display portion, the occupant of the wheelchair can grasp the secured state of the wheelchair and the restrained state of the occupant.

A wheelchair securing structure according to a third aspect is as follows. That is, in addition to the first aspect, a pictogram may be displayed on the display portion, and at least either of a color and a shape of the pictogram may be changed depending on whether the wheelchair is in the secured state where the wheelchair is secured or a non-secured state where the wheelchair is not secured.

In the wheelchair securing structure according to the third aspect, at least either of the color and the shape of the pictogram is changed depending on whether the wheelchair is in the secured state or the non-secured state. Hereby, in comparison with a case where the secured state of the wheelchair is displayed by letters or the like, the secured state of the wheelchair can be grasped intuitively.

A wheelchair securing structure according to a fourth aspect is as follows. That is, in addition to the second aspect, a pictogram may be displayed on the display portion. At least either of a color and a shape of the pictogram may be changed depending on whether the wheelchair is in the secured state where the wheelchair is secured or a non-secured state where the wheelchair is not secured. At least either of the color and the shape of the pictogram may be changed depending on whether the occupant is in the restrained state where the occupant is restrained or a non-restrained state where the occupant is not restrained.

In the wheelchair securing structure according to the fourth aspect, the restrained state of the occupant is displayed by the pictogram in addition to the secured state of the wheelchair. This makes it possible to grasp the restrained state of the occupant intuitively.

A wheelchair securing structure according to a fifth aspect is as follows. That is, in addition to the third or fourth aspect, the wheelchair securing structure may further include a wheelchair detection portion configured to detect that the wheelchair is placed in the wheelchair securing space. The color of the pictogram may be changed depending on whether the wheelchair is in a state where the wheelchair is placed in the wheelchair securing space or in a state where the wheelchair is not placed in the wheelchair securing space.

In the wheelchair securing structure according to the fifth aspect, at the time when the wheelchair is moved to the wheelchair securing space, the occupant can grasp a state where the wheelchair is detected normally.

A wheelchair securing structure according to a sixth aspect is as follows. That is, in addition to any one of the first to fifth aspects, a plurality of wheelchair securing spaces and a plurality of securing devices may be provided inside the vehicle cabin. The display portion may be provided in each of the wheelchair securing spaces.

In the wheelchair securing structure according to the sixth aspect, the display portion is provided in each of the wheelchair securing spaces. Hereby, even in a case where a plurality of wheelchair securing spaces is provided, an occupant in the vehicle cabin can easily specify a place where a wheelchair is in the non-secured state.

A wheelchair securing structure according to a seventh aspect is as follows. That is, in addition to any one of the first to sixth aspects, the securing detection portion may detect that the wheelchair is secured, based on a camera provided in an upper part in the vehicle cabin and configured to capture an image of the wheelchair securing space.

In the wheelchair securing structure according to the seventh aspect, the securing detection portion detects that the wheelchair is secured, when the camera provided in the upper part in the vehicle cabin captures an image of the securing space. Further, since the wheelchair can be detected by the camera, when the secured state by the securing device is established without the wheelchair, it is possible to detect a misuse state.

A wheelchair securing structure according to an eighth aspect is as follows. That is, in addition to any one of the first to seventh aspects, the wheelchair securing structure may further include a sound output portion configured to output alarm or predetermined voice inside the vehicle cabin when the wheelchair is placed in the wheelchair securing space, but the wheelchair is in a non-secured state where the wheelchair is not secured.

In the wheelchair securing structure according to the eighth aspect, when the sound output portion outputs the alarm or the predetermined voice inside the vehicle cabin, an occupant in the vehicle cabin can be notified of the presence of the wheelchair that is not secured. This can promote securing of the wheelchair and improve safety performance for the occupant of the wheelchair.

A wheelchair securing structure according to a ninth aspect is as follows. That is, in addition to the fifth aspect, when the securing detection portion detects that the wheelchair is secured by the securing device in a state where the wheelchair detection portion does not detect that the wheelchair is placed in the wheelchair securing space, a misuse state may be displayed on the display portion.

In the wheelchair securing structure according to the ninth aspect, when a misuse state is displayed on the display portion, a neighboring occupant can recognize the misuse state. This can promote release of the secured state by the securing device and return the misuse state to a normal state.

A wheelchair securing structure according to a tenth aspect is as follows. That is, in addition to any one of the first to ninth aspect, a vehicle outside display portion may be provided on an outer surface of a vehicle body, the vehicle outside display portion being configured to display, to a user outside a vehicle, whether the wheelchair is placed in the wheelchair securing space or not.

In the wheelchair securing structure according to the tenth aspect, a user of a wheelchair outside the vehicle can easily determine whether the user can board the vehicle or not.

A wheelchair securing structure according to an eleventh aspect is as follows. That is, in addition to the tenth aspect, the secured state of the wheelchair, the secured state being detected by the securing detection portion, may be displayed on the vehicle outside display portion.

In the wheelchair securing structure according to the eleventh aspect, by displaying the secured state of the wheelchair to outside the vehicle, a pedestrian and so on outside the vehicle can be promoted to support securing of the wheelchair in a case where the wheelchair has not been secured.

As described above, with the wheelchair securing structure of the present disclosure, an occupant of a wheelchair can easily grasp the secured state of the wheelchair in a vehicle that the wheelchair can board.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 6 is a block diagram illustrating a hardware configuration of the wheelchair securing structure according to the first embodiment;

FIG. 7 is a block diagram illustrating a functional configuration of the wheelchair securing structure according to the first embodiment;

FIG. 17 is a schematic side view illustrating a modification of the wheelchair securing structure according to the first embodiment;

DETAILED DESCRIPTION OF EMBODIMENTS

First Embodiment

The following will describe a wheelchair securing structure 10 according to a first embodiment with reference to the drawings. Note that an arrow FR, an arrow UP, and an arrow RH in each figure indicate an advancing side (the front side) in the vehicle front-rear direction, the upper side in the vehicle up-down direction, and the right side in the vehicle width direction in a vehicle to which the wheelchair securing structure is applied. In a case where a description is made by use of merely the front and rear sides, the right and left sides, and the upper and lower sides, they indicate the front and rear sides in the vehicle front-rear direction, the right and left sides in a state facing toward the advancing side, and the upper and lower sides in the vehicle up-down direction, respectively, unless otherwise specified.

Figure 1:
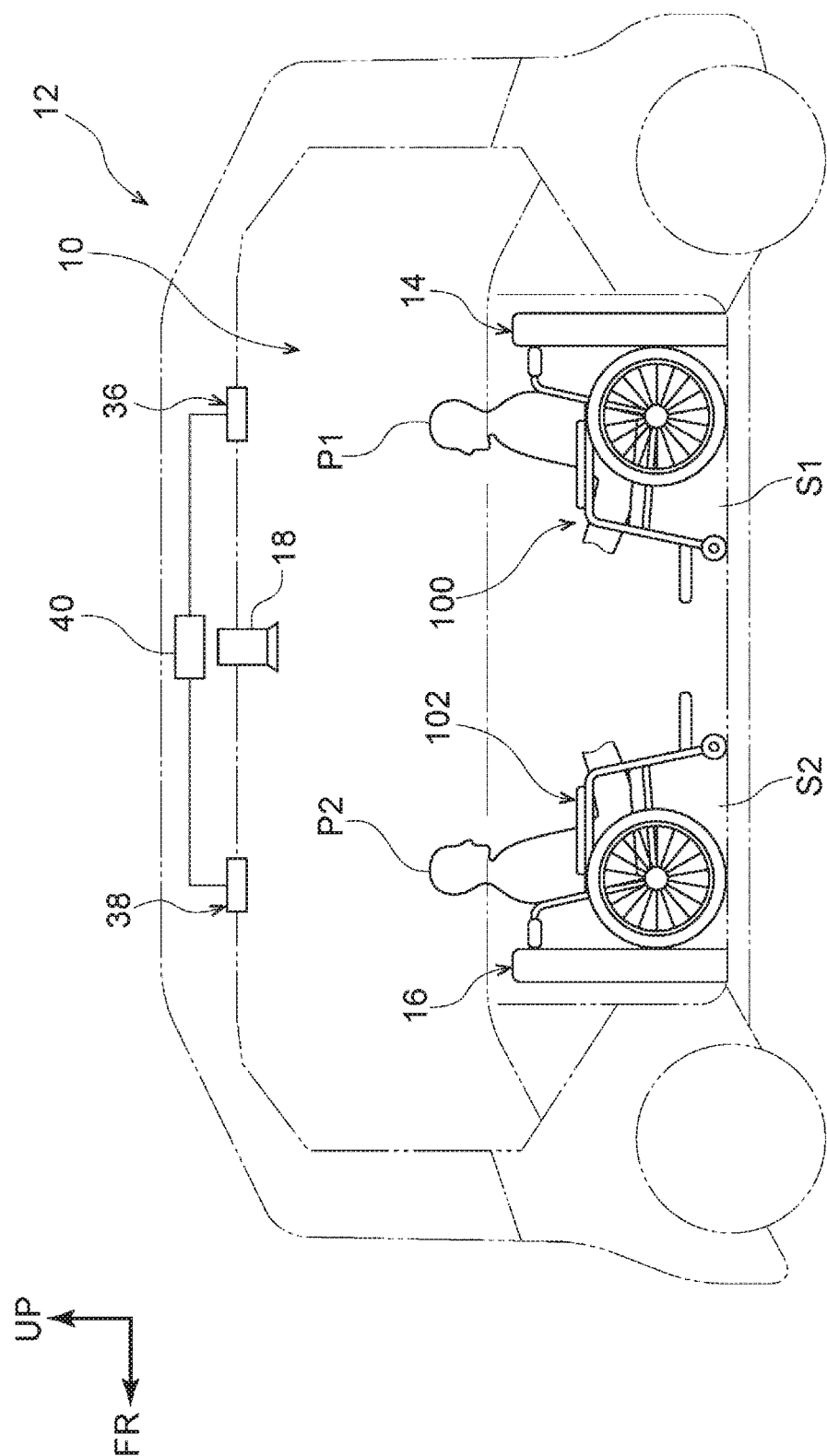
FIG. 1 is a side view of the inside of a vehicle cabin of a vehicle to which a wheelchair securing structure according to a first embodiment is applied, when the inside of the vehicle cabin is viewed from the vehicle width direction.

As illustrated in FIG. 1, a pair of wheelchair securing spaces S1, S2 is provided inside a vehicle cabin of a vehicle 12 to which the wheelchair securing structure 10 of the present embodiment is applied, such that one of the wheelchair securing spaces S1, S2 is provided on the front side and the other one of them is provided on the rear side. The wheelchair securing space S1 is set on the rear side in the vehicle front-rear direction, and a wheelchair 100 is placed in the wheelchair securing space S1. Further, in a rear part of the wheelchair securing space S1, a vertical wall 14 is provided on a floor panel in a standing manner such that wheels of the wheelchair 100 are locked to the vertical wall 14. The wheelchair securing space S2 is set on the front side in the vehicle front-rear direction, and a wheelchair 102 is placed in the wheelchair securing space S2. Further, in a front part of the wheelchair securing space S2, a vertical wall 16 is provided on the floor panel in a standing manner such that wheels of the wheelchair 102 are locked to the vertical wall 16. Note that the present embodiment deals with an example in which the wheelchair securing space S1 and the wheelchair securing space S2 are set at respective positions deviating from each other in the vehicle width direction. That is, the wheelchair securing space S1 is set on the right side in the vehicle width direction in the vehicle cabin, and the wheelchair securing space S2 is set on the left side in the vehicle width direction in the vehicle cabin. On this account, the wheelchair securing space S1 and the wheelchair securing space S2 are set diagonally to each other in the vehicle cabin in a plan view. This restrains an occupant P1 of the wheelchair 100 and an occupant P2 of the wheelchair 102 from facing each other.

The following will describe a device for securing the wheelchair 100 in the wheelchair securing space S1. Note that a securing structure in the wheelchair securing space S2 is similar to that in the wheelchair securing space S1 and therefore will not be described herein.

Figure 2:
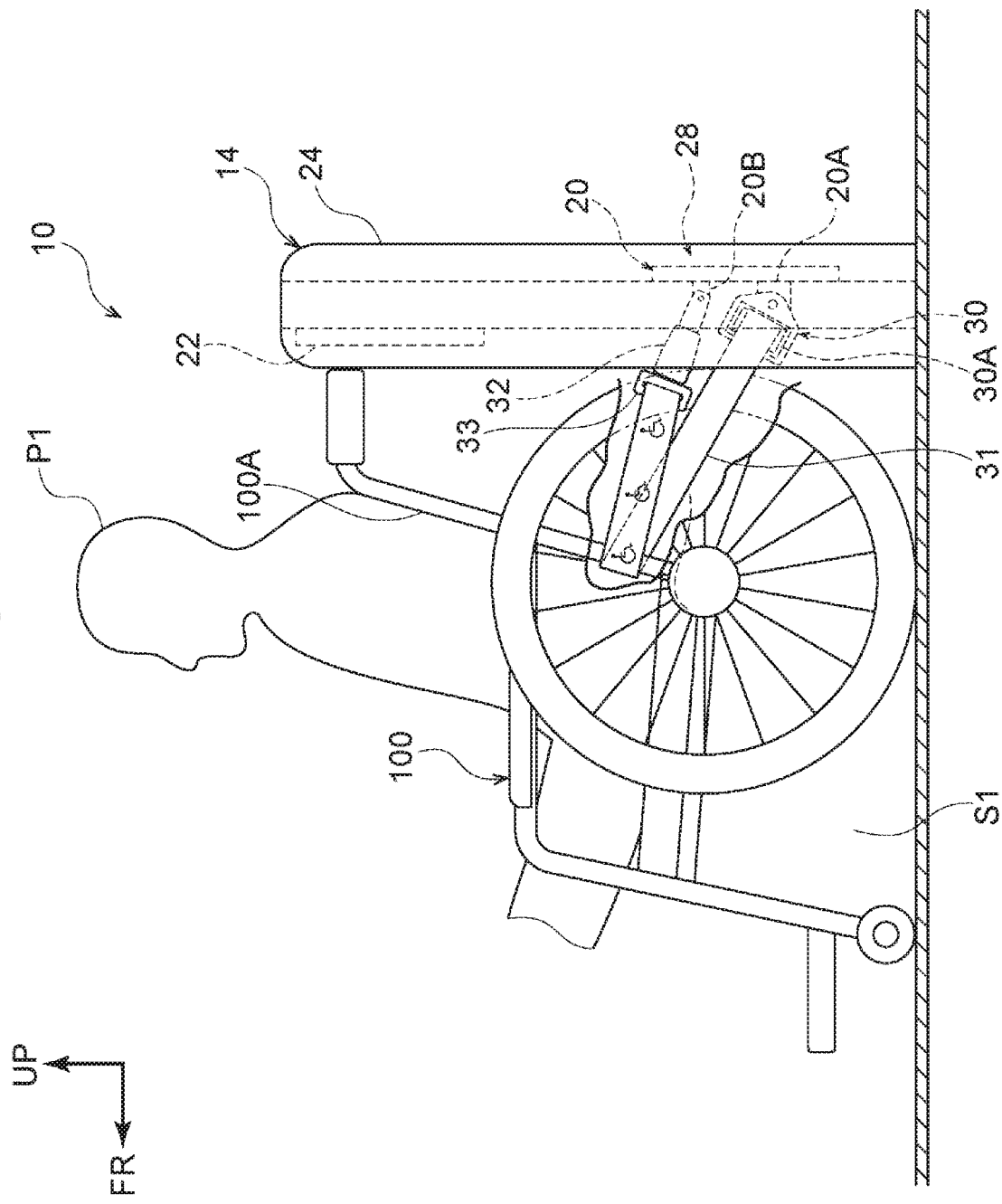
FIG. 2 is a side view of a wheelchair securing space inside the vehicle cabin in the first embodiment, when the wheelchair securing space is viewed from the vehicle width direction, and is a view illustrating a state where a wheelchair is secured.

As illustrated in FIG. 2, the vertical wall 14 extends in the vehicle up-down direction and in the vehicle width direction and includes a belt fixing plate 20, a support plate 22, and a cover 24. The belt fixing plate 20 is placed in a lower part of the vertical wall 14 and extends in the vehicle width direction with its plate-thickness direction being along the vehicle front-rear direction.

The support plate 22 is placed in an upper part of the vertical wall 14 and constitutes a receiver surface that can support the wheelchair 100 from the rear side in the vehicle front-rear direction. More specifically, the support plate 22 extends in the vehicle width direction in front of the belt fixing plate 20 in the vehicle front-rear direction with the plate-thickness direction of the support plate 22 being along the vehicle front-rear direction.

The cover 24 is an interior trim, and the whole belt fixing plate 20 and the whole support plate 22 are covered with the cover 24.

Here, the belt fixing plate 20 is provided with a securing device 28. The securing device 28 includes a first wheelchair retractor 30, a first wheelchair buckle 32, and a first wheelchair belt member 31. Note that, in FIG. 2, for purposes of this description, the first wheelchair retractor 30 and the first wheelchair buckle 32 are placed at different heights. However, in the present embodiment, the first wheelchair retractor 30 and the first wheelchair buckle 32 are disposed at generally the same height.

Figure 3:
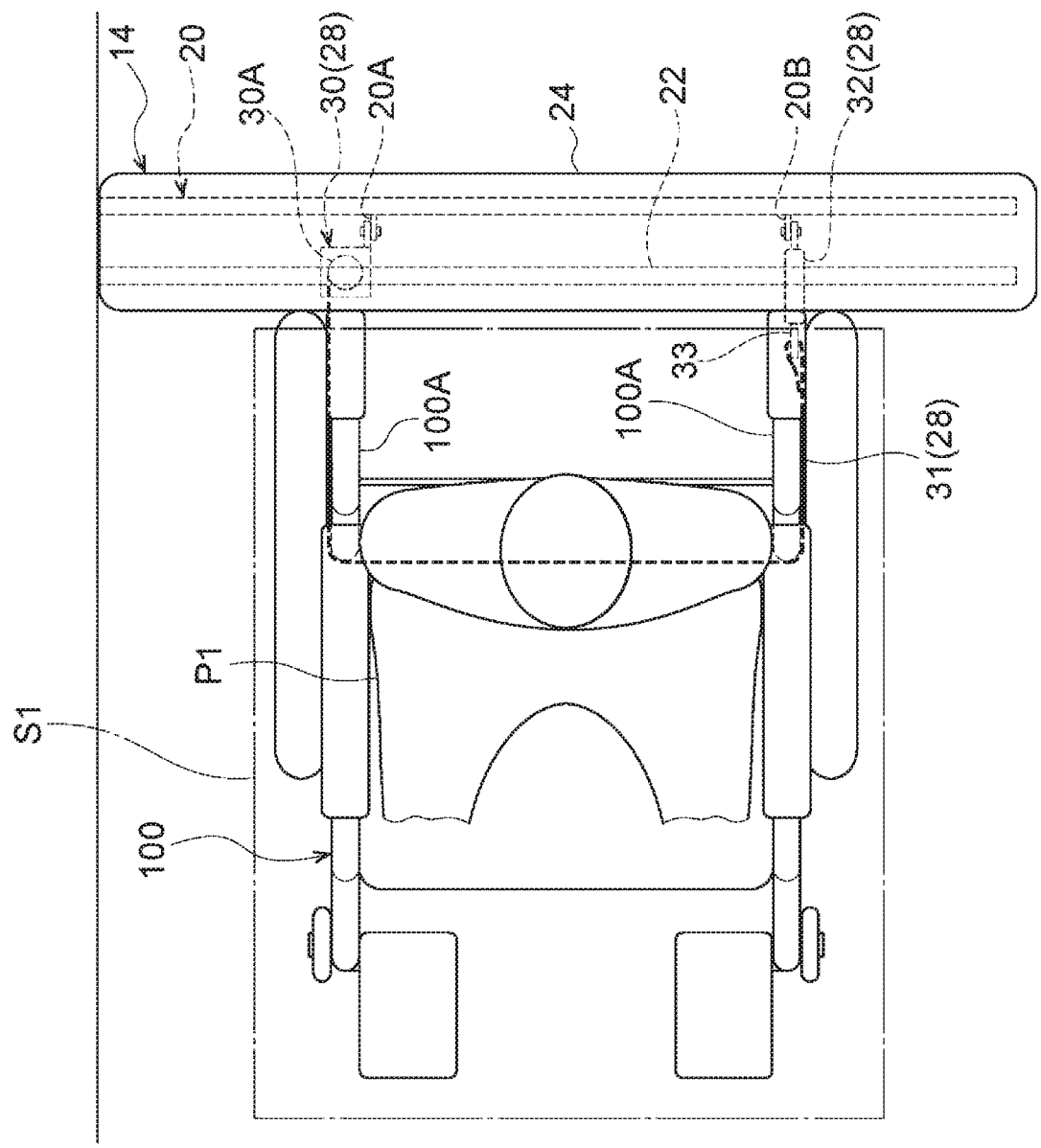
FIG. 3 is a plan view of the wheelchair securing space inside the vehicle cabin in the first embodiment and is a view illustrating the state where the wheelchair is secured.

A first attachment piece 20A extends forward in the vehicle front-rear direction from a lower end portion of the belt fixing plate 20. As illustrated in FIG. 3, the first attachment piece 20A is provided on the right side in the vehicle width direction from the center of the securing space S1 in the vehicle width direction. The first wheelchair retractor 30 is fastened to the first attachment piece 20A by bolt and nut.

The first wheelchair retractor 30 includes a spool 30A, and a first end portion of the first wheelchair belt member 31 is wound up around the spool 30A in a drawable manner. Since the spool 30A is biased by a return spring (not shown) to a direction where the first wheelchair belt member 31 is wound, the first wheelchair belt member 31 is wound around the first wheelchair retractor 30 in an unloaded state except a second end portion of the first wheelchair belt member 31. Here, in the present embodiment, as an example, the first wheelchair belt member 31 is fastened to the first attachment piece 20A in a state where the first wheelchair retractor 30 is inclined so that the first wheelchair belt member 31 is drawn forward in the vehicle front-rear direction and diagonally upward in the vehicle up-down direction.

Further, the first wheelchair retractor 30 includes an emergency locking mechanism (Emergency Locking Retractor: ELR) configured to restrict drawing of the first wheelchair belt member 31 when the first wheelchair belt member 31 is drawn unexpectedly at the time of a collision or the like of the vehicle 12. Further, the first wheelchair retractor 30 includes a wheelchair belt locking mechanism (not shown) for locking and unlocking drawing of the first wheelchair belt member 31. As such a locking mechanism, a wheelchair belt locking mechanism using a solenoid and a locking lever is employed in the present embodiment. That is, the locking lever is moved by applying an electric current to the solenoid so as to bring the spool 30A into an unlocked state. In the meantime, when no electric current is applied to the solenoid, the locking lever is moved to the opposite side so as to bring the spool 30A into a locked state.

The first wheelchair belt member 31 is made of the same fabric material as a webbing for restraining the occupant P1 such that the first wheelchair belt member 31 is formed in an elongated shape. Further, in the present embodiment, as an example, a mark imitating a wheelchair is drawn on one surface of the first wheelchair belt member 31, so that the first wheelchair belt member 31 is intuitively recognizable as a belt for securing the wheelchair 100. Further, a wheelchair tongue plate 33 is attached to the second end portion of the first wheelchair belt member 31.

A second attachment piece 20B is provided on the left side in the vehicle width direction from the first attachment piece 20A. Similarly to the first attachment piece 20A, the second attachment piece 20B extends forward in the vehicle front-rear direction from the lower end portion of the belt fixing plate 20, and the first wheelchair buckle 32 is fastened to the second attachment piece 20B by bolt and nut.

The first wheelchair buckle 32 is provided on the left side in the vehicle width direction from the center of the securing space S1 in the vehicle width direction, and the wheelchair tongue plate 33 is attachable to the first wheelchair buckle 32. Further, the wheelchair buckle 32 of the present embodiment is fastened to the second attachment piece 20B in a state where the wheelchair buckle 32 is inclined such that an insertion hole for the wheelchair tongue plate 33 faces forward in the vehicle front-rear direction and diagonally upward in the vehicle up-down direction so that the wheelchair tongue plate 33 is easily attached to the first wheelchair buckle 32.

FIGS. 2 and 3 illustrate a state where the wheelchair tongue plate 33 is attached to the first wheelchair buckle 32 via a frame 100A of the wheelchair 100, and the wheelchair 100 is secured in this state.

In the wheelchair securing space S2 illustrated in FIG. 1, a securing device similar to the securing device 28 is provided, and the securing device includes a second wheelchair retractor 54 (see FIG. 6). Further, the securing device in the wheelchair securing space S2 includes a second wheelchair buckle and a second wheelchair belt member (not shown) in addition to the second wheelchair retractor 54. The wheelchair 102 is secured by the securing device.

A camera 18 as a securing detection portion is disposed in an upper part of the vehicle 12. The camera 18 is disposed in a central part, in the vehicle front-rear direction, of a ceiling in the vehicle cabin and a central part, in the vehicle width direction, of the ceiling. An image of the inside of the vehicle cabin including the wheelchair securing space S1 and the wheelchair securing space S2 is captured by the camera 18. That is, in the present embodiment, as an example, an image of both the wheelchair securing spaces S1 and S2 provided at two places can be captured by a single camera 18.

Further, the ceiling of the vehicle 12 is provided with a first display device 36 and a second display device 38. The first display device 36 is provided at a position where the first display device 36 is visually recognizable by the occupant P1 of the wheelchair 100 from the wheelchair securing space S1 in the vehicle cabin. In the present embodiment, the first display device 36 is placed above the wheelchair securing space S1. Further, the first display device 36 is placed in a state where its display surface faces the occupant P1 of the wheelchair 100.

Figure 4A:
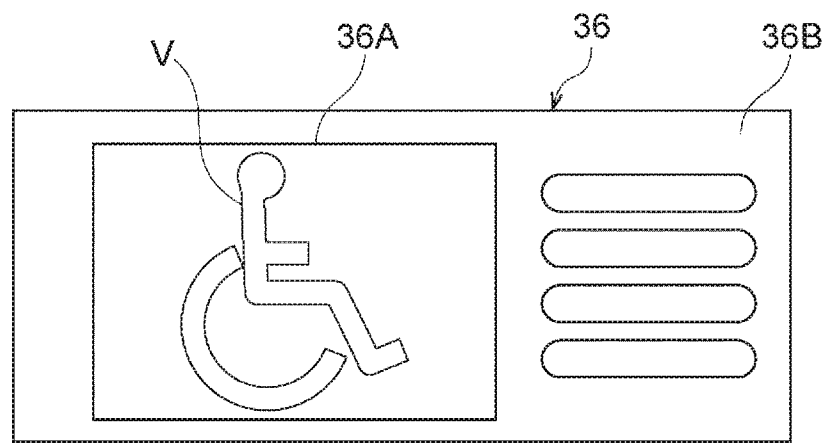
FIG. 4A is a schematic view illustrating a pictogram displayed on a first display portion in the first embodiment when no wheelchair is on board.

As illustrated in FIG. 4A, the first display device 36 includes a first display portion 36A and a first speaker 36B. The first display portion 36A is configured such that a pictogram V imitating an occupant on a wheelchair is displayed thereon.

The first speaker 36B is provided adjacent to the first display portion 36A and includes a plurality of openings through which sound is output.

As illustrated in FIG. 1, the second display device 38 is provided at a position where the second display device 38 is visually recognizable by the occupant P2 of the wheelchair 102 from the wheelchair securing space S2 in the vehicle cabin. In the present embodiment, the second display device 38 is placed above the wheelchair securing space S2. Further, the second display device 38 is placed in a state where its display surface faces the occupant P2 of the wheelchair 102. Further, the second display device 38 includes a second display portion 38A and a second speaker 38B, similarly to the first display device 36 (see FIG. 6).

Here, the camera 18, the first display portion 36A, and the second display portion 38A are electrically connected to an electronic control unit (ECU) 40 as a controlling portion.

Hardware Configuration of Wheelchair Securing Structure 10

FIG. 6 is a block diagram illustrating a hardware configuration of the wheelchair securing structure 10. As illustrated in this FIG. 6, the ECU 40 constituting the wheelchair securing structure 10 includes a central processing unit (CPU: a processor) 44, a read only memory (ROM) 46, a random access memory (RAM) 48, a storage 50, and an input-output interface 52. Those constituents are connected to each other via a bus 42 in a mutually communicable manner.

The CPU 44 is a central processing unit and is configured to execute various programs and control each portion. That is, the CPU 44 reads a program from the ROM 46 or the storage 50 and executes the program in the RAM 48 as a working area. The CPU 44 is configured to perform a control on each constituent and various computing processes in accordance with the program stored in the ROM 46 or the storage 50.

In the ROM 46, various programs and various pieces of data are stored. A program or data is temporarily stored in the RAM 48 as a working area. The storage 50 is constituted by a hard disk drive (HDD) or a solid state drive (SSD) such that various programs including an operating system and various pieces of data are stored in the storage 50. In the present embodiment, a display change program and so on to change displays on the first display portion 36A and the second display portion 38A are stored in the ROM 46 or the storage 50.

The camera 18, the first wheelchair retractor 30, the second wheelchair retractor 54, the first display device 36, and the second display device 38 are connected to the input-output interface 52. These devices are controlled by the ECU 40.

Functional Constituents of Wheelchair Securing Structure 10

The wheelchair securing structure 10 implements various functions by use of the above hardware resources. Functional constituents implemented by the wheelchair securing structure 10 will be described with reference to FIG. 7.

As illustrated in FIG. 7, the wheelchair securing structure 10 includes a wheelchair detection portion 56, a securing detection portion 58, a video image analysis portion 60, a secured-state determination portion 62, a display change portion 64, and a sound output portion 66 as the functional constituents. The functional constituents are implemented such that the CPU 44 reads and executes programs stored in the ROM 46 or the storage 50.

The wheelchair detection portion 56 detects that the wheelchair 100 is placed in the wheelchair securing space S1 illustrated in FIG. 1. Further, the wheelchair detection portion 56 detects that the wheelchair 102 is placed in the wheelchair securing space S2. In the present embodiment, as an example, the wheelchair 100 and the wheelchair 102 are specified from an image captured by the camera 18.

The securing detection portion 58 detects completion of securing of the wheelchair 100 and completion of securing of the wheelchair 102. More specifically, the securing detection portion 58 detects, from the image captured by the camera 18, that the wheelchair tongue plate 33 is attached to the first wheelchair buckle 32. Further, the securing detection portion 58 detects, from the image captured by the camera 18, that the wheelchair tongue plate is attached to the second wheelchair buckle.

The video image analysis portion 60 analyzes the image captured by the camera 18. When the video image analysis portion 60 analyzes the image, the wheelchair 100 is specified from the image, for example. Further, from the image, a position of the first wheelchair buckle 32 and a position of the wheelchair tongue plate 33 are specified.

The secured-state determination portion 62 determines respective secured states of the wheelchair 100 and the wheelchair 102. That is, when the securing detection portion 58 detects that the wheelchair tongue plate 33 is attached to the first wheelchair buckle 32, the secured-state determination portion 62 determines that the wheelchair 100 is in a secured state. Further, when the securing detection portion 58 does not detect that the wheelchair tongue plate 33 is attached to the first wheelchair buckle 32, the secured-state determination portion 62 determines that the wheelchair 100 is in a non-secured state where the wheelchair 100 is not secured. Similarly, when the securing detection portion 58 detects that the wheelchair tongue plate is attached to the second wheelchair buckle, the secured-state determination portion 62 determines that the wheelchair 102 is in the secured state. Further, when the securing detection portion 58 does not detect that the wheelchair tongue plate is attached to the second wheelchair buckle, the secured-state determination portion 62 determines that the wheelchair 102 is in the non-secured state.

The display change portion 64 changes respective display states of the first display portion 36A and the second display portion 38A in accordance with respective placement states of the wheelchair 100 and the wheelchair 102 and respective secured states of the wheelchair 100 and the wheelchair 102. The following describes a case where the display state of the first display portion 36A is changed, but the display state of the second display portion 38A is changed in a similar manner. More specifically, in a case where the wheelchair 100 is not placed in the wheelchair securing space S1, the display change portion 64 lights a pictogram V in white as illustrated in FIG. 4A.

Figure 4B:
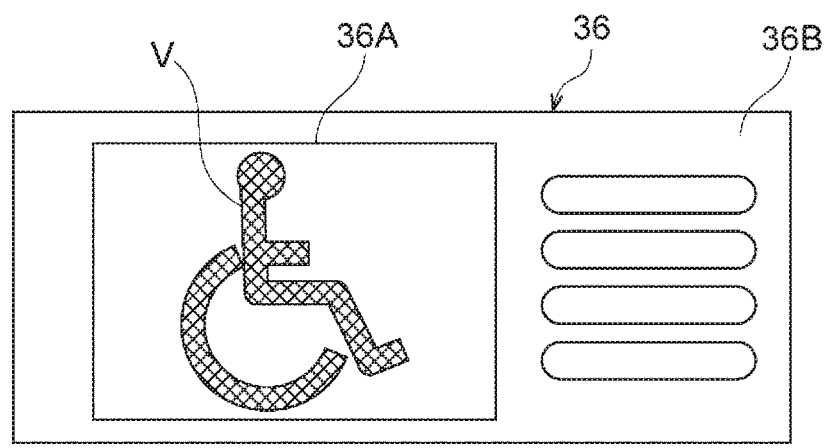
FIG. 4B is a schematic view illustrating a pictogram displayed on the first display portion in the first embodiment when a wheelchair is detected.

Further, in a case where the wheelchair 100 is placed in the wheelchair securing space S1, the display change portion 64 lights the pictogram V in a color other than white as illustrated in FIG. 4B. In the present embodiment, as an example, the pictogram V is lit in red.

Figure 4C:
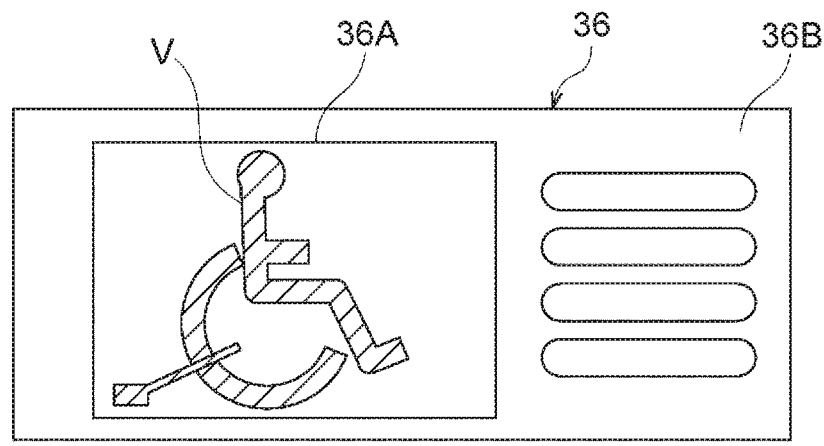
FIG. 4C is a schematic view illustrating a pictogram displayed on the first display portion in the first embodiment when the wheelchair enters a secured state.

Further, in a case where securing of the wheelchair 100 is completed and the wheelchair 100 enters the secured state, the display change portion 64 lights the pictogram V in a color other than white and red as illustrated in FIG. 4C. In the present embodiment, as an example, the pictogram V is lit in green. Further, the display change portion 64 changes the shape of the pictogram V. More specifically, the pictogram V is changed into a shape imitating a state where a wheelchair is bound.

Figure 5A:
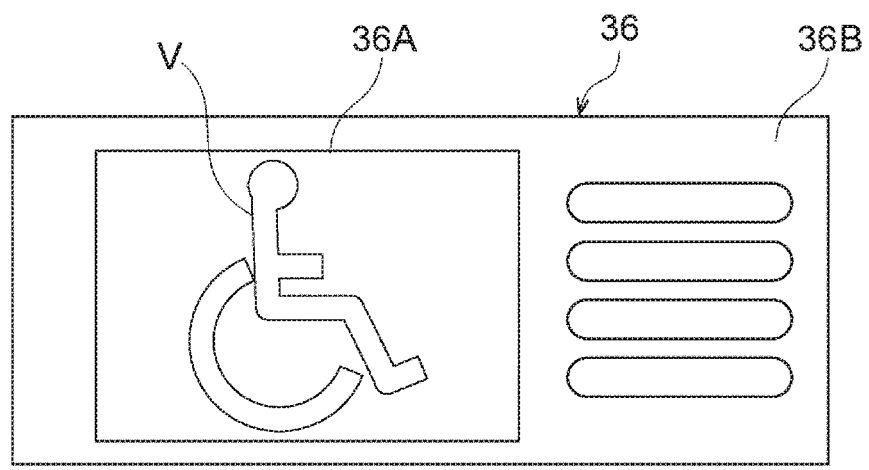
FIG. 5A is a schematic view illustrating a pictogram displayed on the first display portion in the first embodiment when no wheelchair is on board.

Furthermore, in a state where the wheelchair 100 is not placed in the wheelchair securing space S1, when the securing detection portion 58 detects that the wheelchair tongue plate 33 is attached to the first wheelchair buckle 32, the display change portion 64 changes the display. More specifically, the display change portion 64 shifts a state where the pictogram V is lit in white as illustrated in FIG. 5A to a state illustrated in FIG. 5B, so that the pictogram V is flashed in white. Thus, a misuse state is displayed on the first display portion 36A.

Figure 5B:
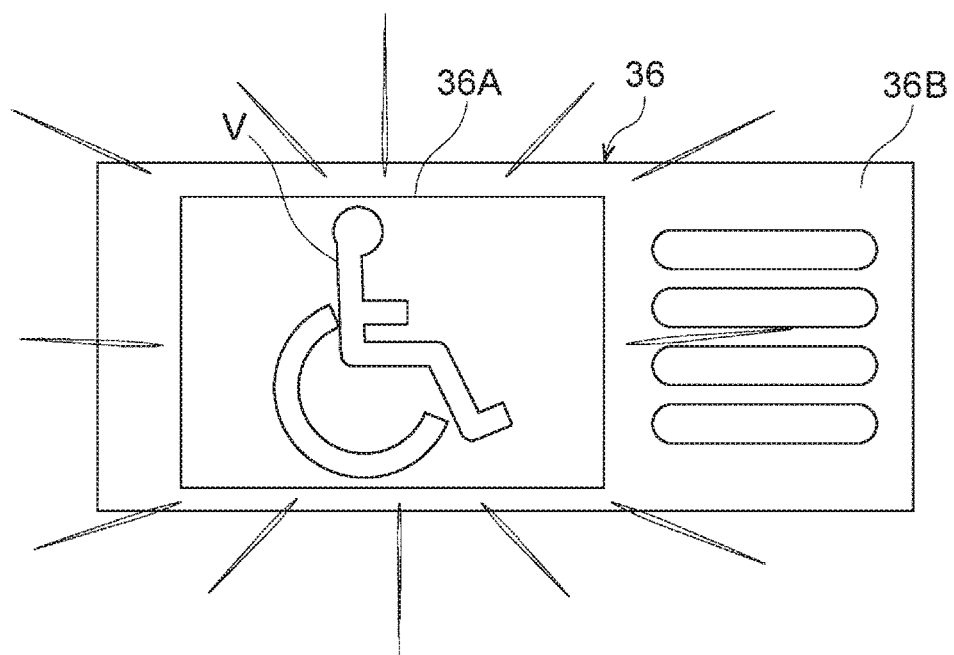
FIG. 5B is a schematic view illustrating a pictogram displayed on the first display portion in the first embodiment in a wheelchair secured state when no wheelchair is on board.

The sound output portion 66 illustrated in FIG. 7 outputs alarm or predetermined voice inside the vehicle cabin. More specifically, the sound output portion 66 causes the first speaker 36B of the first display device 36 or the second speaker 38B of the second display device 38 to output the alarm or the predetermined voice. For example, in a case of the misuse state as illustrated in FIG. 5B, the sound output portion 66 causes the first speaker 36B to output the alarm or the predetermined voice. The predetermined voice is a message or the like that promotes a neighboring occupant to release an attached state of the first wheelchair belt member 31.

Operation

Next will be described an operation of the present embodiment.

Example of Display Change Process

Figure 8:
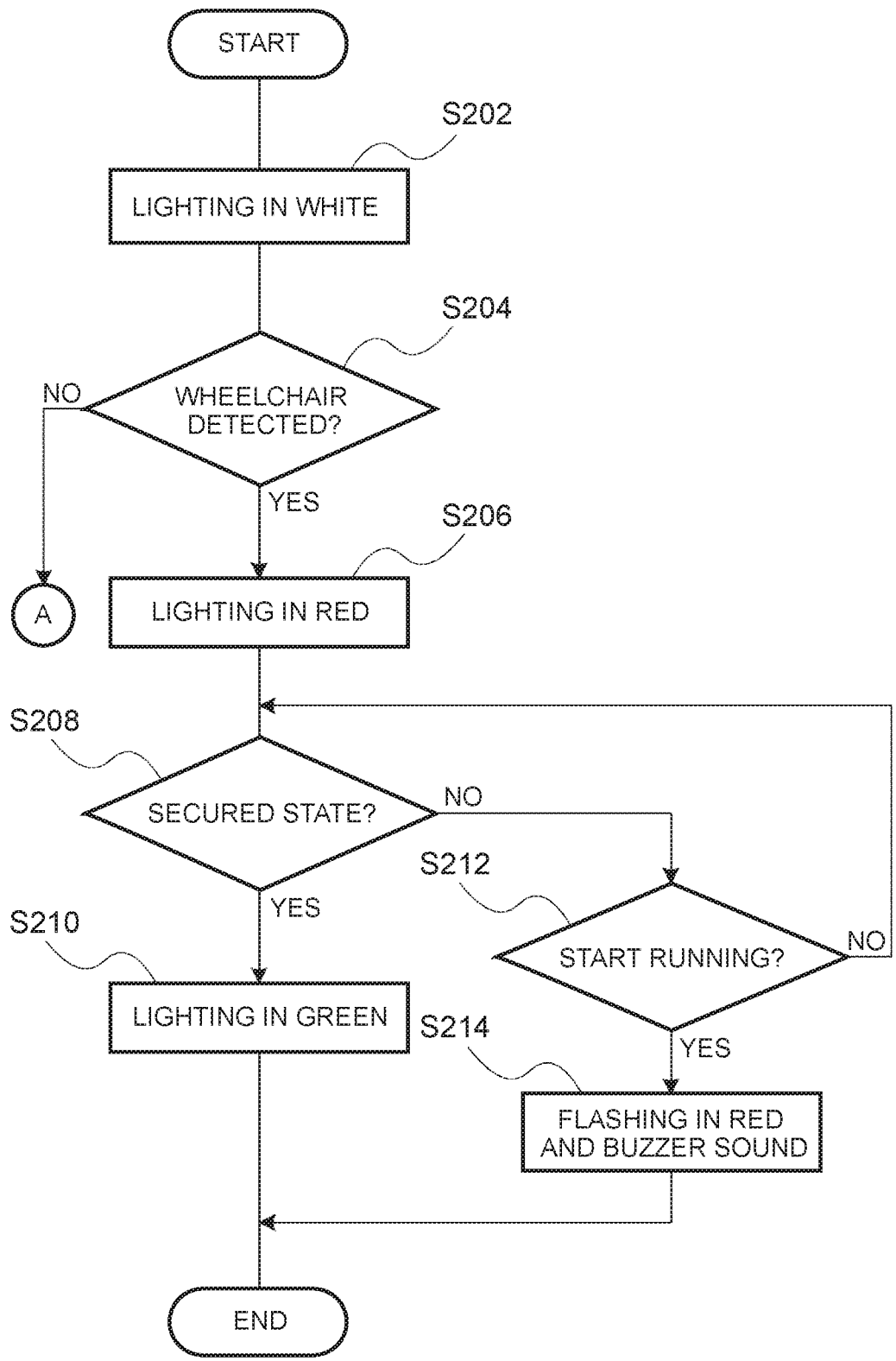
FIG. 8 is a part of a flowchart illustrating the procedure of a display change process in the first embodiment.
Figure 9:
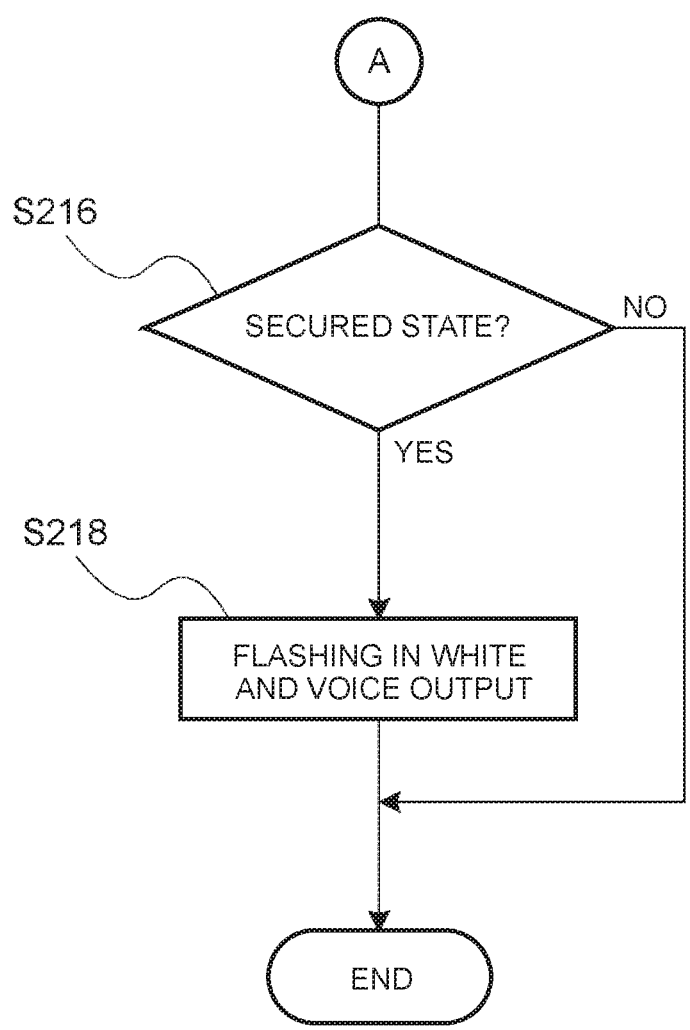
FIG. 9 is a part of the flowchart illustrating the procedure of the display change process in the first embodiment.

The following describes an example of the procedure of the display change process with reference to flowcharts of FIGS. 8 and 9. The display change process is executed such that the CPU 44 reads a display change program from the ROM 46 or the storage 50 and executes the display change program by developing the display change program in the RAM 48. Note that the following describes a display change of the first display device 36 as an example.

As illustrated in FIG. 8, the CPU 44 lights the pictogram V of the first display portion 36A in white in step S202 (see FIG. 4A). At this time, the wheelchair 100 is not placed in the wheelchair securing space S1.

In step S204, the CPU 44 determines whether or not the wheelchair 100 is placed in the wheelchair securing space S1. When the occupant P1 of the wheelchair 100 gets on the vehicle 12 and moves to the wheelchair securing space S1, the wheelchair 100 is detected by the camera 18 by the function of the wheelchair detection portion 56. When the wheelchair 100 is detected as such, the CPU 44 determines that the wheelchair 100 is placed, and the CPU 44 shifts to a process of step S206. In the meantime, when the wheelchair 100 is not detected, the CPU 44 determines that the wheelchair 100 is not placed, and the CPU 44 shifts to a process of step S216 (see FIG. 9).

The CPU 44 lights the pictogram V of the first display portion 36A in red in step S206 (see FIG. 4B). Hereby, at the time when the wheelchair 100 is moved to the wheelchair securing space S1, the occupant P1 can grasp a state where the wheelchair 100 is detected normally. Further, the display portion is provided in each of the wheelchair securing spaces S1, S2. Accordingly, even in a case where a plurality of wheelchair securing spaces S1, S2 is provided, an occupant in the vehicle cabin can easily specify places where the wheelchairs 100, 102 are in the non-secured state.

Subsequently, in step S208, the CPU 44 determines whether the wheelchair 100 is in the secured state or not, by the function of the secured-state determination portion 62. Then, when the CPU 44 determines that the wheelchair 100 is in the secured state, the CPU 44 shifts to a process of step S210. The CPU 44 lights the pictogram V of the first display portion 36A in green in step S210 and ends the display change process (see FIG. 4C). This allows the occupant P1 of the wheelchair 100 to easily grasp the secured state of the wheelchair 100. Further, at least either of the color and the shape of the pictogram V is changed depending on whether the wheelchair 100 is in the secured state or the non-secured state. Hereby, in comparison with a case where the secured state of the wheelchair 100 is displayed by letters or the like, the occupant P1 and an occupant around the wheelchair 100 can intuitively grasp the secured state of the wheelchair 100.

In the meantime, when the CPU 44 determines, in step S208, that the wheelchair 100 is not in the secured state, namely, the wheelchair 100 is in the non-secured state, the CPU 44 shifts to a process of step S212. In step S212, the CPU 44 determines whether the vehicle 12 starts running or not. In the present embodiment, as an example, in at least either of a case where a vehicle speed sensor (not shown) detects that the speed of the vehicle 12 becomes 5 km or more per an hour and a case where a running distance from a stop state of the vehicle 12 reaches 100 m or more, the CPU 44 determines that the vehicle 12 starts running.

When the CPU 44 determines, in step S212, that the vehicle 12 starts running, the CPU 44 shifts to a process of step S214. Further, when the CPU 44 determines, in step S212, that the vehicle 12 does not start running, that is, the vehicle 12 maintains its stop state, the CPU 44 returns to the process of step S208.

In step S214, the CPU 44 flashes the pictogram V of the first display portion 36A in red and causes the first speaker 36B to output the alarm or the predetermined voice by the function of the sound output portion 66. For example, a message or the like that promotes the occupant P1 of the wheelchair 100 to attach the first wheelchair belt member 31 is output as voice. When the sound output portion 66 outputs the alarm or the predetermined voice inside the vehicle cabin as such, an occupant in the vehicle cabin can be notified of the presence of the wheelchair 100 that is not secured. This can promote securing of the wheelchair 100 and improve safe performance for the occupant P1 of the wheelchair 100.

Here, when the CPU 44 determines, in step S204, that the wheelchair 100 is not placed in the wheelchair securing space S1, the CPU 44 shifts to a process of step S216 illustrated in FIG. 9. In step S216, the CPU 44 determines whether the secured state is established or not. More specifically, when the wheelchair tongue plate 33 is attached to the first wheelchair buckle 32, the CPU 44 determines that the secured state is established even when the wheelchair 100 is not placed.

When the CPU 44 determines, in step S216, that the secured state is established, the CPU 44 shifts to a process of step S218 and flashes the pictogram V of the first display portion 36A in white (see FIG. 5B). Further, a message or the like that promotes a neighboring occupant to release the attached state of the first wheelchair belt member 31 is output from the first speaker 36B as voice. When a misuse state is displayed on the first display portion 36A as such, an occupant around the wheelchair 100 can recognize the misuse state. This consequently can promote release of the secured state by the securing device 28 and return the misuse state to a normal state.

In the meantime, when the CPU 44 determines, in step S216, that the secured state is not established, the CPU 44 ends the display change process while the pictogram V is kept lit in white.

Note that, in the present embodiment, the presence or absence of the wheelchair 100 can be detected by the camera 18. Accordingly, when the secured state by the securing device 28 is established without the wheelchair 100, it is possible to easily detect the misuse state.

Second Embodiment

Next will be described a wheelchair securing structure 70 according to a second embodiment with reference to FIGS. 10 to 16. Note that the same reference sign is assigned to a constituent similar to a constituent described in the first embodiment, and a description thereof is omitted appropriately. Further, the following deals with only the wheelchair securing space S1, and a description about the wheelchair securing space S2 is omitted.

Figure 10:
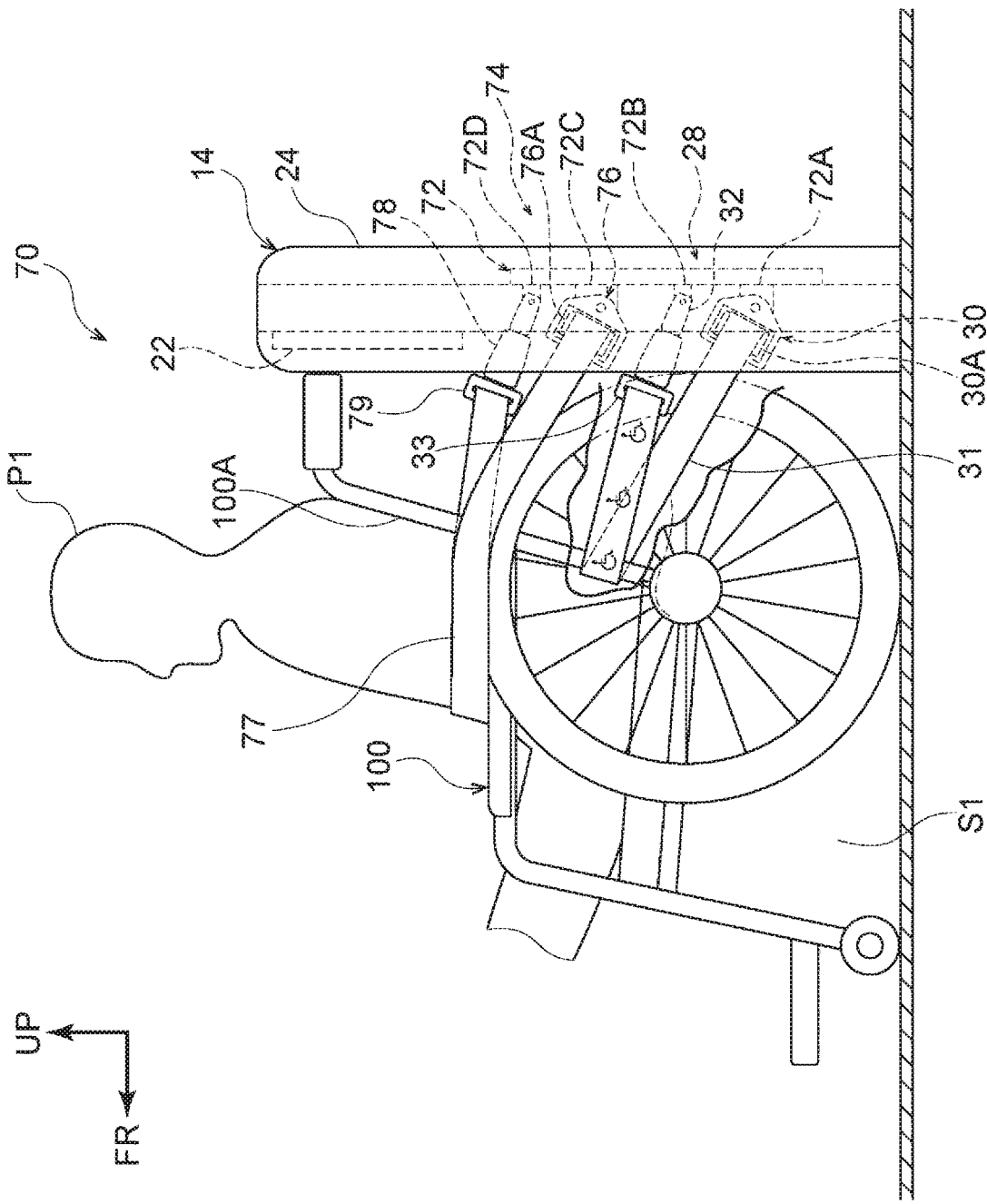
FIG. 10 is a side view of the wheelchair securing space inside the vehicle cabin in a second embodiment when the wheelchair securing space is viewed from the vehicle width direction and is a view illustrating a state where a wheelchair is secured and an occupant is restrained.
Figure 11:
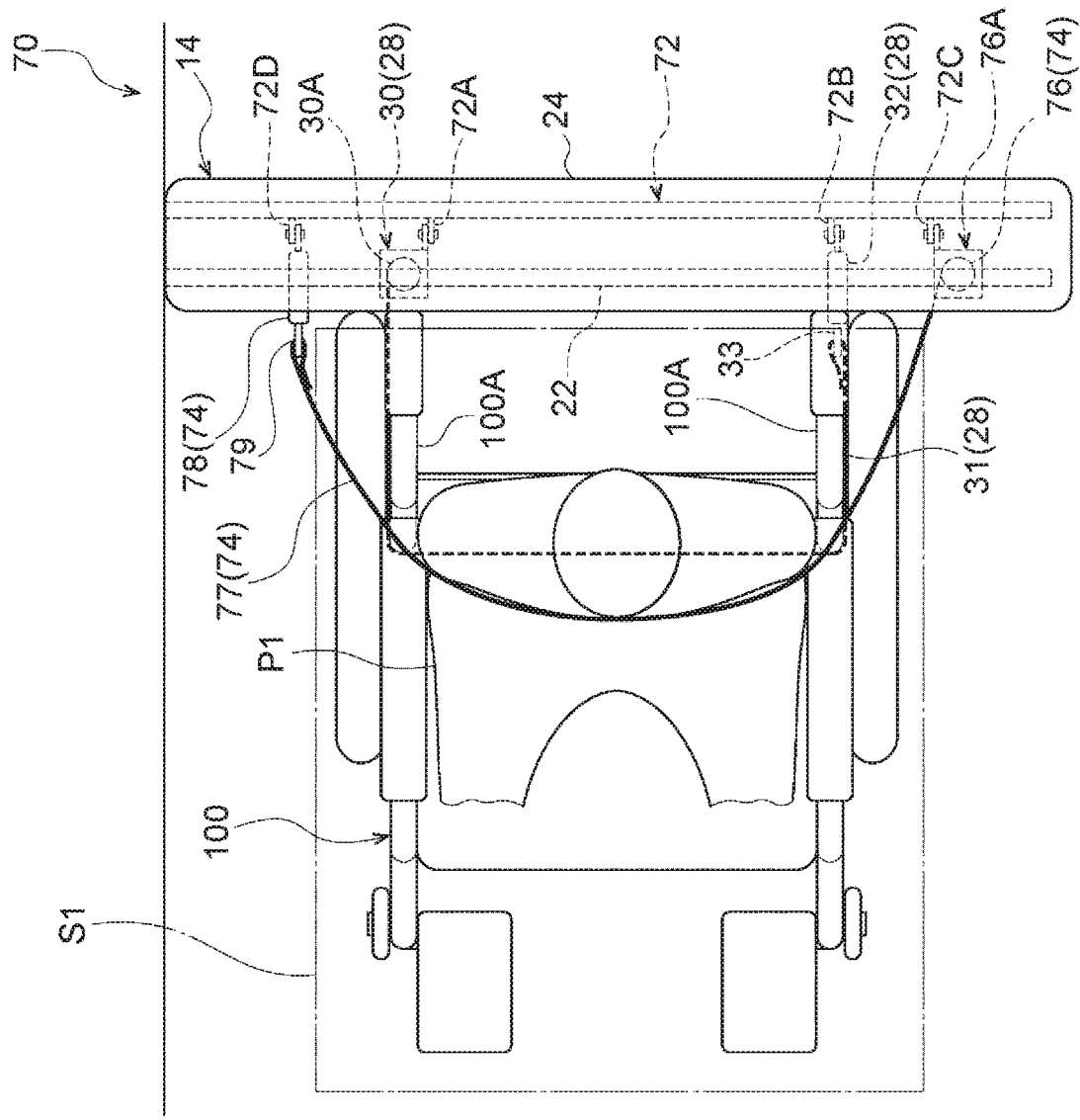
FIG. 11 is a plan view of the wheelchair securing space inside the vehicle cabin in the second embodiment and is a view illustrating the state where the wheelchair is secured and the occupant is restrained.

As illustrated in FIGS. 10 and 11, in the wheelchair securing structure 70 of the present embodiment, a belt fixing plate 72 is provided on the vertical wall 14, instead of the belt fixing plate 20. The belt fixing plate 72 is placed in a lower part of the vertical wall 14 and extends in the vehicle width direction with its plate-thickness direction being along the vehicle front-rear direction. Further, the belt fixing plate 72 is formed to be longer than the belt fixing plate 20 of the first embodiment in terms of the up-down direction.

The belt fixing plate 72 is provided with a restraint device 74 configured to restrain the occupant P1 of the wheelchair 100, in addition to the securing device 28. The securing device 28 includes the first wheelchair retractor 30, the first wheelchair buckle 32, and the first wheelchair belt member 31. In the meantime, the restraint device 74 includes a first occupant retractor 76, a first occupant buckle 78, and a first occupant belt member 77.

The first wheelchair retractor 30 is fastened to a first attachment piece 72A by bolt and nut. The first attachment piece 72A extends forward in the vehicle front-rear direction from a part of the belt fixing plate 72, the part being on the right side in the vehicle width direction from the center of the securing space S1 in the vehicle width direction. Further, the first wheelchair buckle 32 is fastened to a second attachment piece 72B by bolt and nut. The second attachment piece 72B extends forward in the vehicle front-rear direction from a part of the belt fixing plate 72, the part being on the left side in the vehicle width direction from the center of the securing space S1 in the vehicle width direction.

A third attachment piece 72C is provided in a part of the belt fixing plate 72 on the left side in the vehicle width direction from the second attachment piece 72B. The third attachment piece 72C extends forward in the vehicle front-rear direction from an upper end portion of the belt fixing plate 72, and the first occupant retractor 76 is fastened to the third attachment piece 72C by bolt and nut. That is, the first occupant retractor 76 is disposed at a position farther from the securing space S than the first wheelchair buckle 32. Further, the first occupant retractor 76 is disposed above the first wheelchair buckle 32 in the vehicle up-down direction.

The first occupant retractor 76 includes a spool 76A, and a first end portion of the first occupant belt member 77 is wound up around the spool 76A in a drawable manner. Since the spool 76A is biased by a return spring (not shown) to a direction where the first occupant belt member 77 is wound, the first occupant belt member 77 is wound around the first occupant retractor 76 in an unloaded state except a second end portion of the first occupant belt member 77. Here, in the present embodiment, as an example, the first occupant retractor 76 is fastened to the third attachment piece 72C in a state where the first occupant retractor 76 is inclined so that the first occupant belt member 77 is drawn forward in the vehicle front-rear direction and diagonally upward in the vehicle up-down direction.

Further, the first occupant retractor 76 includes an emergency locking mechanism (Emergency Locking Retractor: ELR) configured to restrict drawing of the first occupant belt member 77 when the first occupant belt member 77 is drawn unexpectedly at the time of a collision or the like of the vehicle 12. Further, the first occupant retractor 76 includes a belt locking mechanism (not shown) for locking and unlocking drawing of the first occupant belt member 77, so that the first occupant retractor 76 can electrically switch between a locked state where the first occupant belt member 77 is not drawable and an unlocked state where the first occupant belt member 77 is drawable.

A fourth attachment piece 72D is provided on the right side in the vehicle width direction from the first attachment piece 72A. Similarly to the third attachment piece 72C, the fourth attachment piece 72D extends forward in the vehicle front-rear direction from the upper end portion of the belt fixing plate 72, and the first occupant buckle 78 is fastened to the fourth attachment piece 72D by bolt and nut. That is, the first occupant buckle 78 is disposed at a position farther from the securing space S than the first wheelchair retractor 30. Further, the first occupant buckle 78 is disposed above the first wheelchair retractor 30 in the vehicle up-down direction.

The first occupant buckle 78 is disposed on a side opposite from the first occupant retractor 76 across the securing space S. Further, an occupant tongue plate 79 attached to the second end portion of the first occupant belt member 77 is attachable to the first occupant buckle 78. Further, the first occupant buckle 78 of the present embodiment is fastened to the fourth attachment piece 72D in a state where an insertion hole for the occupant tongue plate 79 faces forward in the vehicle front-rear direction and diagonally upward in the vehicle up-down direction so that the occupant tongue plate 79 is easily attached to the first occupant buckle 78.

FIGS. 10 and 11 illustrate a state where the wheelchair tongue plate 33 is attached to the first wheelchair buckle 32 via the frame 100A of the wheelchair 100, and the wheelchair 100 is secured in this state. Further, a state where the occupant tongue plate 79 is attached to the first occupant buckle 78 is illustrated herein, and the occupant P1 of the wheelchair 100 is restrained in this state.

Hardware Configuration of Wheelchair Securing Structure 70

Figure 13:
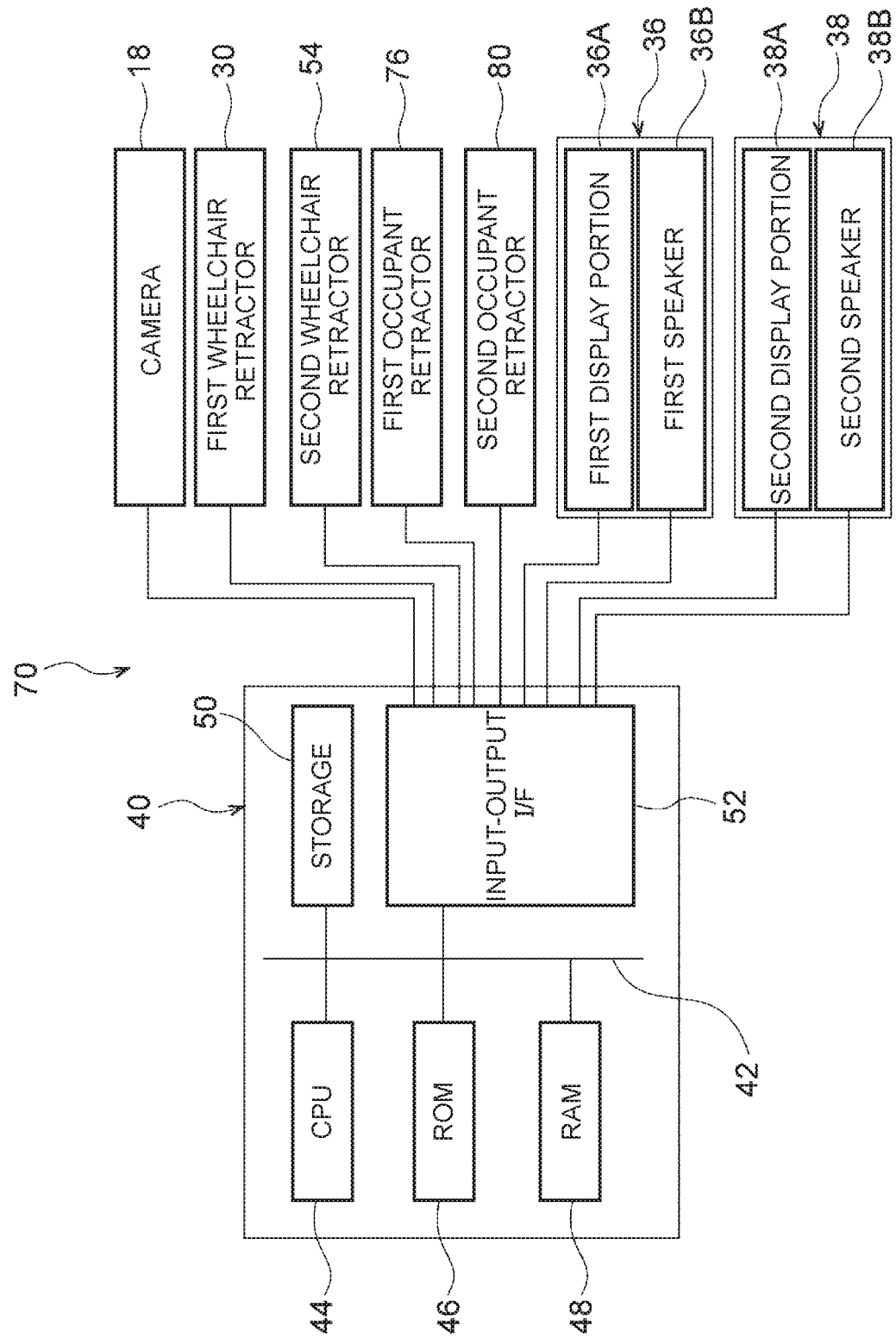
FIG. 13 is a block diagram illustrating a hardware configuration of the wheelchair securing structure according to the second embodiment.

FIG. 13 is a block diagram illustrating a hardware configuration of the wheelchair securing structure 70. As illustrated in FIG. 13, the camera 18, the first wheelchair retractor 30, the second wheelchair retractor 54, the first occupant retractor 76, the second occupant retractor 80, the first display device 36, and the second display device 38 are connected to the input-output interface 52 of the ECU 40 constituting the wheelchair securing structure 70. These devices are controlled by the ECU 40.

Functional Constituents of Wheelchair Securing Structure 70

The wheelchair securing structure 70 implements various functions by use of the above hardware resources. Functional constituents implemented by the wheelchair securing structure 70 will be described with reference to FIG. 14.

Figure 14:
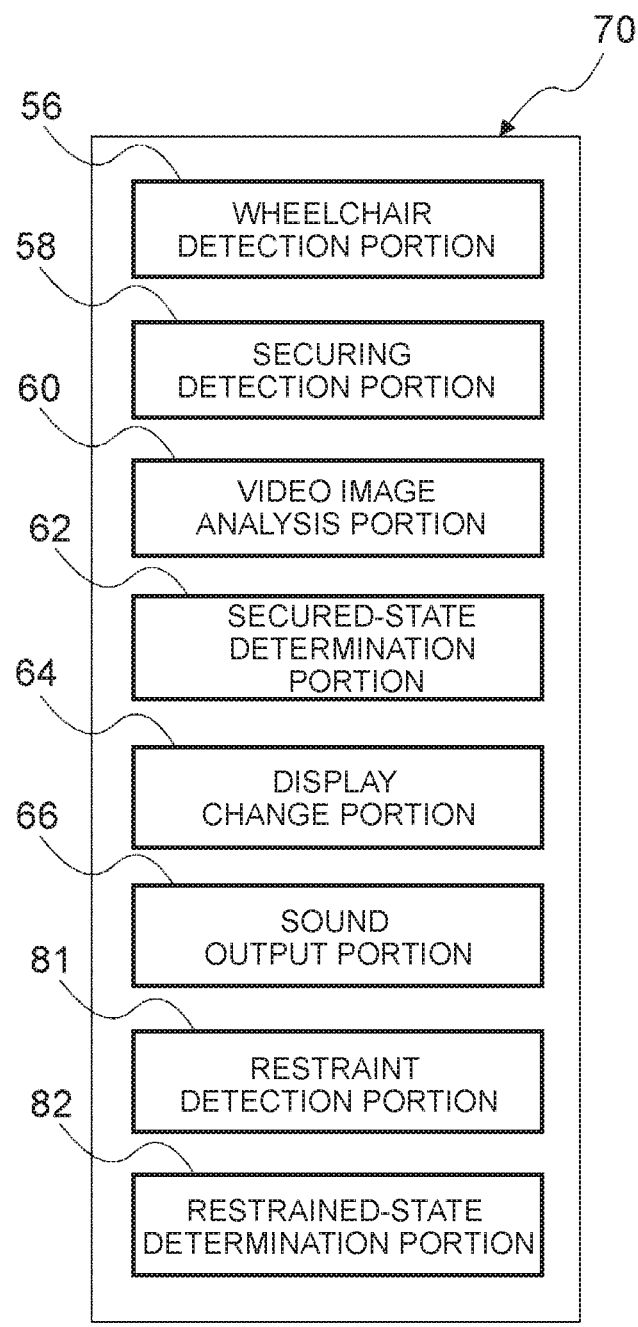
FIG. 14 is a block diagram illustrating a functional configuration of the wheelchair securing structure according to the second embodiment.

As illustrated in FIG. 14, the wheelchair securing structure 70 includes the wheelchair detection portion 56, the securing detection portion 58, the video image analysis portion 60, the secured-state determination portion 62, the display change portion 64, the sound output portion 66, a restraint detection portion 81, and a restrained-state determination portion 82 as the functional constituents. The functional constituents are implemented such that the CPU 44 reads and executes programs stored in the ROM 46 or the storage 50.

The restraint detection portion 81 detects that the occupant P1 is restrained by the restraint device 74. More specifically, the restraint detection portion 81 detects, from the image captured by the camera 18, that the occupant tongue plate 79 is attached to the first occupant buckle 78.

The restrained-state determination portion 82 determines a restrained state of the occupant P1 of the wheelchair 100. That is, when the restraint detection portion 81 detects, based on the camera 18, that the occupant tongue plate 79 is attached to the first occupant buckle 78, the restrained-state determination portion 82 determines that the occupant P1 is in the restrained state. Further, when the restraint detection portion 81 does not detect that the occupant tongue plate 79 is attached to the first occupant buckle 78, the restrained-state determination portion 82 determines that the occupant P1 is in a non-restrained state where the occupant P1 is not restrained.

Figure 12A:
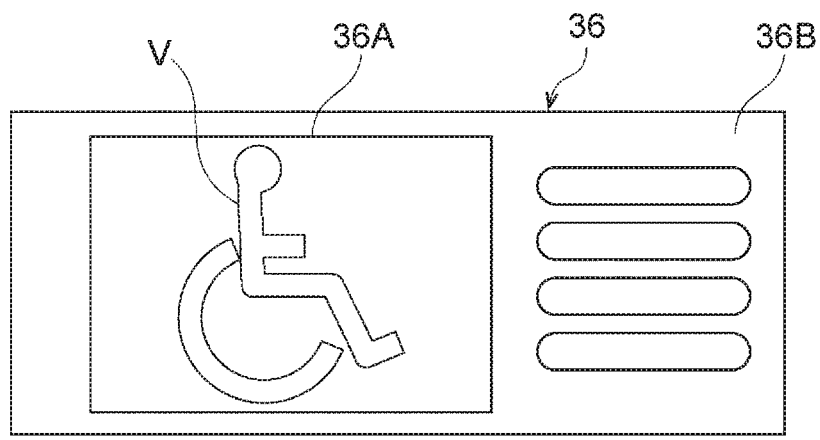
FIG. 12A is a schematic view illustrating a pictogram displayed on the first display portion in the second embodiment when no wheelchair is on board.

Further, the display change portion 64 changes respective display states of the first display portion 36A and the second display portion 38A in accordance with respective placement states of the wheelchair 100 and the wheelchair 102, respective secured states of the wheelchair 100 and the wheelchair 102, and respective restrained states of the occupant P1 and the occupant P2. The following describes a case where the display state of the first display portion 36A is changed, but the display state of the second display portion 38A is changed in a similar manner. More specifically, in a case where the wheelchair 100 is not placed in the wheelchair securing space S1, the display change portion 64 lights the pictogram V in white as illustrated in FIG. 12A.

Figure 12B:
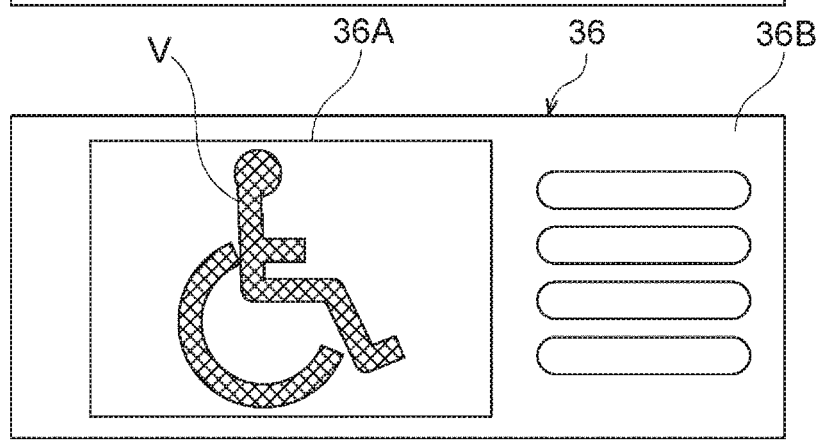
FIG. 12B is a schematic view illustrating a pictogram displayed on the first display portion in the second embodiment when a wheelchair is detected.

Further, in a case where the wheelchair 100 is placed in the wheelchair securing space S1, the display change portion 64 lights the pictogram V in a color other than white as illustrated in FIG. 12B. In the present embodiment, as an example, the pictogram V is lit in red.

Figure 12C:
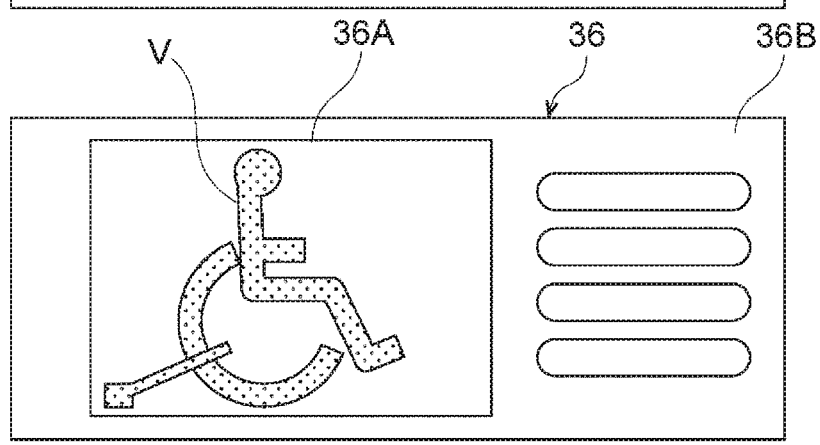
FIG. 12C is a schematic view illustrating a pictogram displayed on the first display portion in the second embodiment when the wheelchair enters a secured state.

Further, in a case where securing of the wheelchair 100 is completed and the wheelchair 100 enters the secured state, the display change portion 64 lights the pictogram V in a color other than white and red as illustrated in FIG. 12C. In the present embodiment, as an example, the pictogram V is lit in yellow. Further, the display change portion 64 changes the shape of the pictogram V. More specifically, the pictogram V is changed into a shape imitating a state where a wheelchair is bound.

Figure 12D:
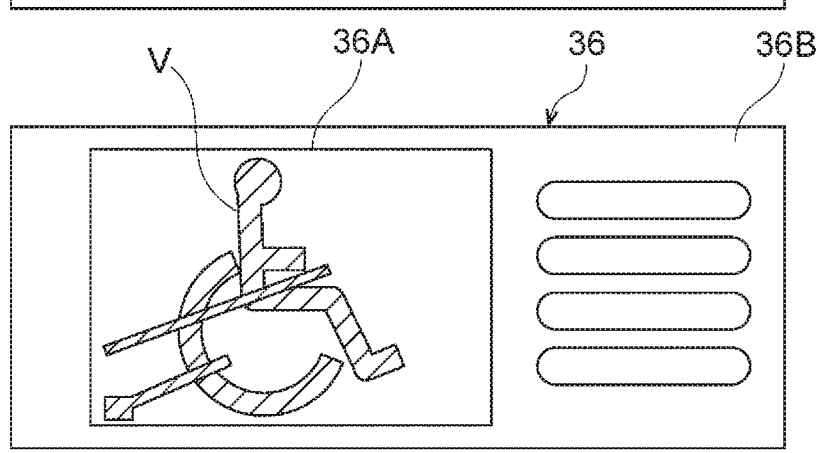
FIG. 12D is a schematic view illustrating a pictogram displayed on the first display portion in the second embodiment when the occupant enters a restrained state.

Furthermore, in a case where the wheelchair 100 enters the secured state and restraining of the occupant is completed so that the occupant enters the restrained state, the display change portion 64 lights the pictogram V in green as illustrated in FIG. 12D. Further, the display change portion 64 changes the shape of the pictogram V. More specifically, the pictogram V is changed into a shape imitating a state where an occupant is restrained by a belt.

Further, in a state where the wheelchair 100 is not placed in the wheelchair securing space S1, when the securing detection portion 58 detects that the wheelchair tongue plate 33 is attached to the first wheelchair buckle 32, the display change portion 64 displays a misuse state on the first display portion 36A, similarly to the first embodiment (see FIG. 5B).

Operation

Next will be described an operation of the present embodiment.

Example of Display Change Process

Figure 15:
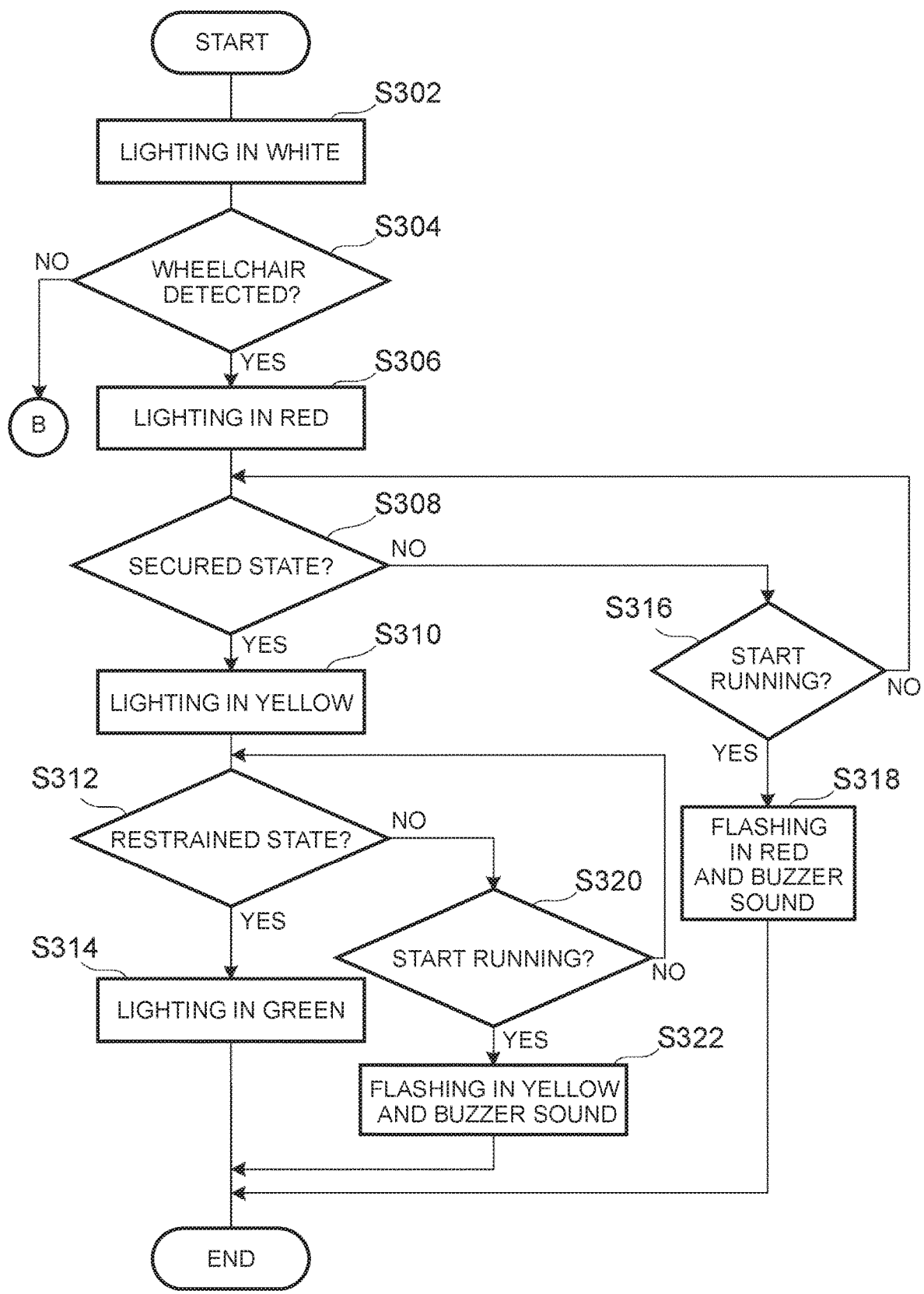
FIG. 15 is a part of a flowchart illustrating the procedure of a display change process in the second embodiment.
Figure 16:
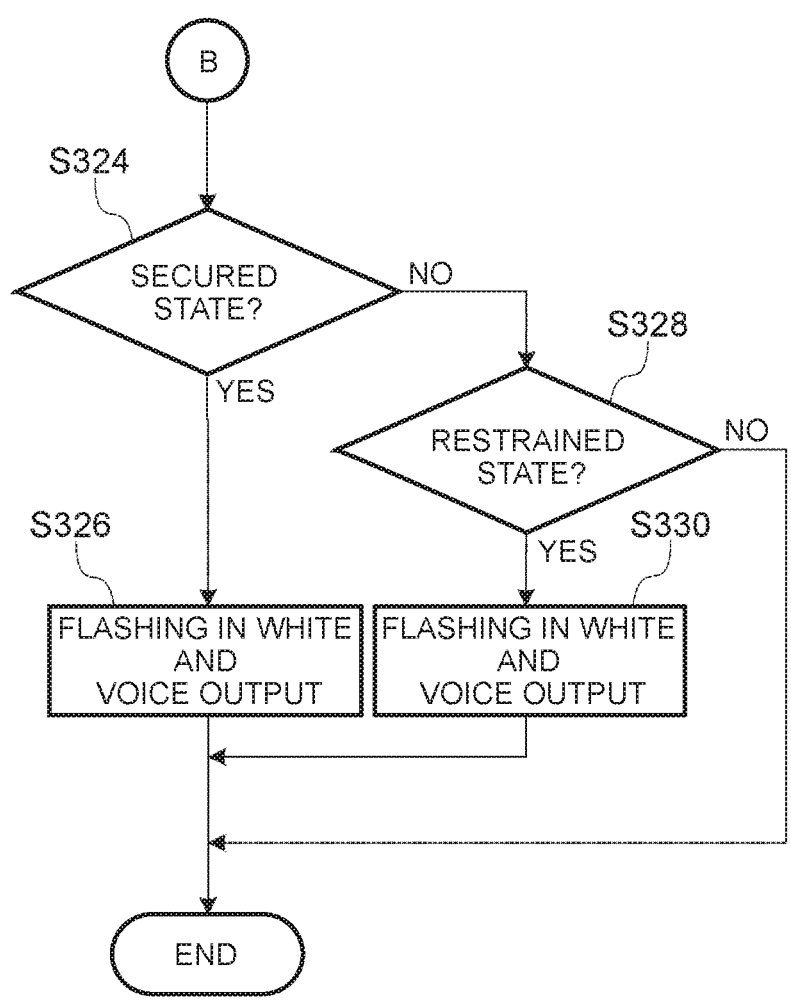
FIG. 16 is a part of the flowchart illustrating the procedure of the display change process in the second embodiment.

The following describes an example of the procedure of the display change process with reference to flowcharts of FIGS. 15 and 16. The display change process is executed such that the CPU 44 reads a display change program from the ROM 46 or the storage 50 and executes the display change program by developing the display change program in the RAM 48. Note that the following describes a display change of the first display device 36 as an example.

As illustrated in FIG. 15, the CPU 44 lights the pictogram V of the first display portion 36A in white in step S302 (see FIG. 12A). At this time, the wheelchair 100 is not placed in the wheelchair securing space S1.

In step S304, the CPU 44 determines whether or not the wheelchair 100 is placed in the wheelchair securing space S1. When the occupant P1 of the wheelchair 100 gets on the vehicle 12 and moves to the wheelchair securing space S1, the wheelchair 100 is detected by the camera 18 by the function of the wheelchair detection portion 56. When the wheelchair 100 is detected as such, the CPU 44 determines that the wheelchair 100 is placed, and the CPU 44 shifts to a process of step S306. In the meantime, when the wheelchair 100 is not detected, the CPU 44 determines that the wheelchair 100 is not placed, and the CPU 44 shifts to a process of step S324 (see FIG. 16). Processes of step S324 and its subsequent steps will be described later.

The CPU 44 lights the pictogram V of the first display portion 36A in red in step S306 (see FIG. 12B). Hereby, at the time when the wheelchair 100 is moved to the wheelchair securing space S1, the occupant P1 can grasp a state where the wheelchair 100 is detected normally.

Subsequently, in step S308, the CPU 44 determines whether the wheelchair 100 is in the secured state or not, by the function of the secured-state determination portion 62. Then, when the CPU 44 determines that the wheelchair 100 is in the secured state, the CPU 44 shifts to a process of step S310. The CPU 44 lights the pictogram V of the first display portion 36A in yellow in step S310 (see FIG. 12C).

In the meantime, when the CPU 44 determines, in step S308, that the wheelchair 100 is not in the secured state, namely, the wheelchair 100 is in the non-secured state, the CPU 44 shifts to a process of step S316. In step S316, the CPU 44 determines whether the vehicle 12 starts running or not. Similarly to the first embodiment, in the present embodiment, in at least either of a case where a vehicle speed sensor (not shown) detects that the speed of the vehicle 12 becomes 5 km or more per an hour and a case where a running distance from a stop state of the vehicle 12 reaches 100 m or more, the CPU 44 determines that the vehicle 12 starts running.

When the CPU 44 determines, in step S316, that the vehicle 12 starts running, the CPU 44 shifts to a process of step S318. Further, when the CPU 44 determines, in step S316, that the vehicle 12 does not start running, that is, the vehicle 12 maintains its stop state, the CPU 44 returns to the process of step S308.

In step S318, the CPU 44 flashes the pictogram V of the first display portion 36A in red and causes the first speaker 36B to output the alarm or the predetermined voice by the function of the sound output portion 66.

After the CPU 44 lights the pictogram V in yellow in step S310, the CPU 44 determines, in step S312, whether the occupant P1 of the wheelchair 100 is in the restrained state or not, by the function of the restrained-state determination portion 82. Then, when the CPU 44 determines that the occupant P1 is in the restrained state, the CPU 44 shifts to a process of step S314. The CPU 44 lights the pictogram V of the first display portion 36A in green in step S314 and ends the display change process (see FIG. 12D).

In the meantime, when the CPU 44 determines, in step S312, that the occupant P1 is not in the restrained state, namely, the occupant P1 is in the non-restrained state, the CPU 44 shifts to a process of step S320. In step S320, the CPU 44 determines whether the vehicle 12 starts running or not. When the CPU 44 determines, in step S320, that the vehicle 12 starts running, the CPU 44 shifts to a process of step S322. Further, when the CPU 44 determines, in step S320, that the vehicle 12 does not start running, that is, the vehicle 12 maintains its stop state, the CPU 44 returns to the process of step S312.

In step S322, the CPU 44 flashes the pictogram V of the first display portion 36A in yellow and causes the first speaker 36B to output the alarm or the predetermined voice by the function of the sound output portion 66. For example, a message or the like that promotes the occupant P1 of the wheelchair 100 to wear the first occupant belt member 77 is output as voice. When the sound output portion 66 outputs the alarm or the predetermined voice inside the vehicle cabin as such, the occupant P1 and a neighboring occupant can be notified that restraining of the occupant P1 is not performed appropriately. This can promote restraint of the occupant P1 and improve safety performance for the occupant P1.

Here, when the CPU 44 determines, in step S304, that the wheelchair 100 is not placed in the wheelchair securing space S1, the CPU 44 shifts to a process of step S324 illustrated in FIG. 16. In step S324, the CPU 44 determines whether the secured state is established or not. More specifically, when the wheelchair tongue plate 33 is attached to the first wheelchair buckle 32, the CPU 44 determines that the secured state is established even when the wheelchair 100 is not placed.

When the CPU 44 determines, in step S324, that the secured state is established, the CPU 44 shifts to a process of step S326 and flashes the pictogram V of the first display portion 36A in white (see FIG. 5B). Further, a message or the like that promotes a neighboring occupant to release the attached state of the first wheelchair belt member 31 is output from the first speaker 36B as voice.

In the meantime, when the CPU 44 determines, in step S324, that the secured state is not established, the CPU 44 shifts to a process of step S328. In step S328, the CPU 44 determines whether the restrained state is established or not. More specifically, when the occupant tongue plate 79 is attached to the first occupant buckle 78, the CPU 44 determines that the restrained state is established even when the wheelchair 100 is not placed.

When the CPU 44 determines, in step S328, that the restrained state is established, the CPU 44 shifts to a process of step S330 and flashes the pictogram V of the first display portion 36A in white (see FIG. 5B). Further, a message or the like that promotes a neighboring occupant to release the attached state of the first occupant belt member 77 is output from the first speaker 36B as voice. When a misuse state is displayed on the first display portion 36A as such, an occupant around the wheelchair 100 can recognize the misuse state. This can promote release of the restrained state by the restraint device 74 and return the misuse state to a normal state.

The wheelchair securing structures of the first embodiment and the second embodiment have been described above, but it is needless to say that the present disclosure may be performable in various embodiments as long as the various embodiments are not beyond the gist of the present disclosure. For example, in the first embodiment, the secured states of the wheelchairs are displayed by the first display device 36 and the second display device 38 in the vehicle cabin as illustrated in FIG. 1. However, in addition to this, a vehicle outside display portion 84 may be provided on an outer surface of a vehicle body as illustrated in FIG. 17.

Modification

As illustrated in FIG. 17, in the present modification, the vehicle outside display portion 84 is provided on a left wall of the vehicle 12, and whether or not wheelchairs are placed in the wheelchair securing spaces S1, S2 is displayed on the vehicle outside display portion 84 with respect to a user outside the vehicle.

Figure 18A:
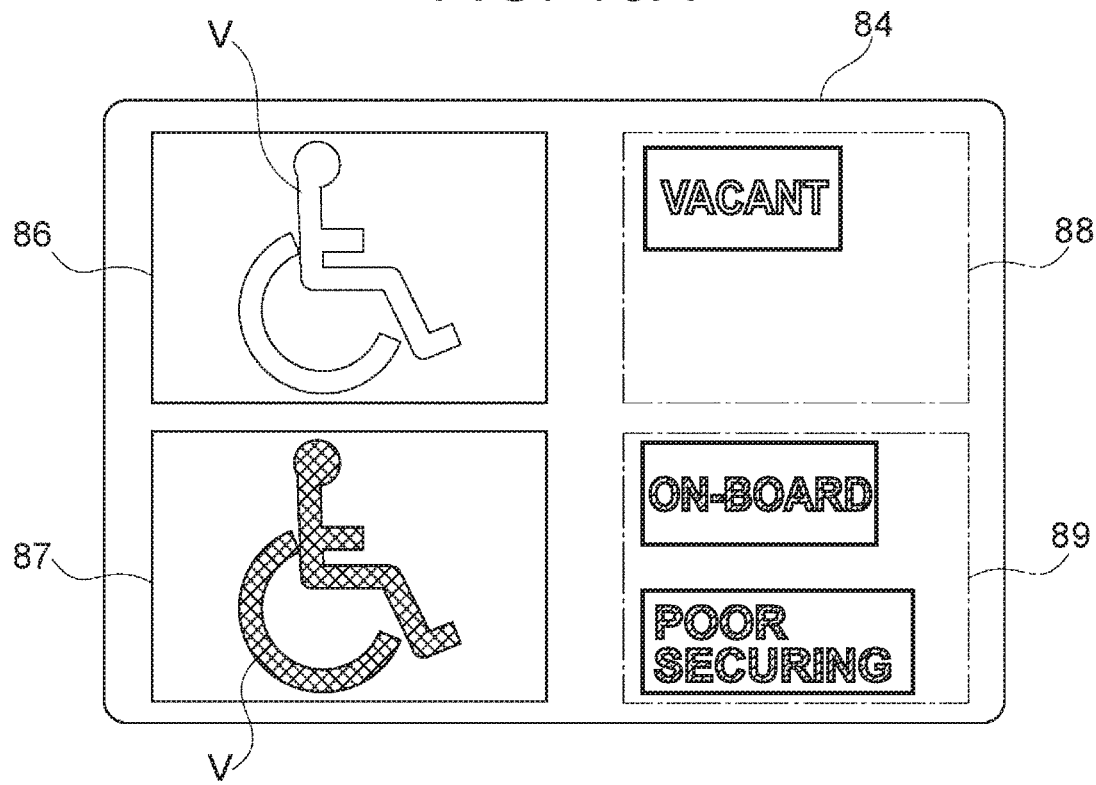
FIG. 18A is an enlarged view illustrating an outer surface display in the first embodiment in an enlarged manner and illustrates a state where a first wheelchair securing space is vacant, and a wheelchair placed in a second wheelchair securing space is poorly secured.

As illustrated in FIG. 18A, the vehicle outside display portion 84 includes a rear-side pictogram display portion 86, a front-side pictogram display portion 87, a rear-side state display portion 88, and a front-side state display portion 89.

The rear-side pictogram display portion 86 and the rear-side state display portion 88 correspond to the wheelchair securing space S1. Further, the front-side pictogram display portion 87 and the front-side state display portion 89 correspond to the wheelchair securing space S2.

In a state of FIG. 18A, the pictogram V lit in white is displayed on the rear-side pictogram display portion 86, and a display indicative of vacancy is displayed on the rear-side state display portion 88. Namely, this indicates a state where no wheelchair is placed in the wheelchair securing space S1. This allows a user of a wheelchair outside the vehicle to easily determine that the user can board the vehicle.

In the meantime, the pictogram V lit in red is displayed on the front-side pictogram display portion 87, and a display indicative of on-board and poor securing in red letters is displayed on the front-side state display portion 89. Namely, this indicates a state where a wheelchair is placed in the wheelchair securing space S2, but the wheelchair is in the non-secured state.

Figure 18B:
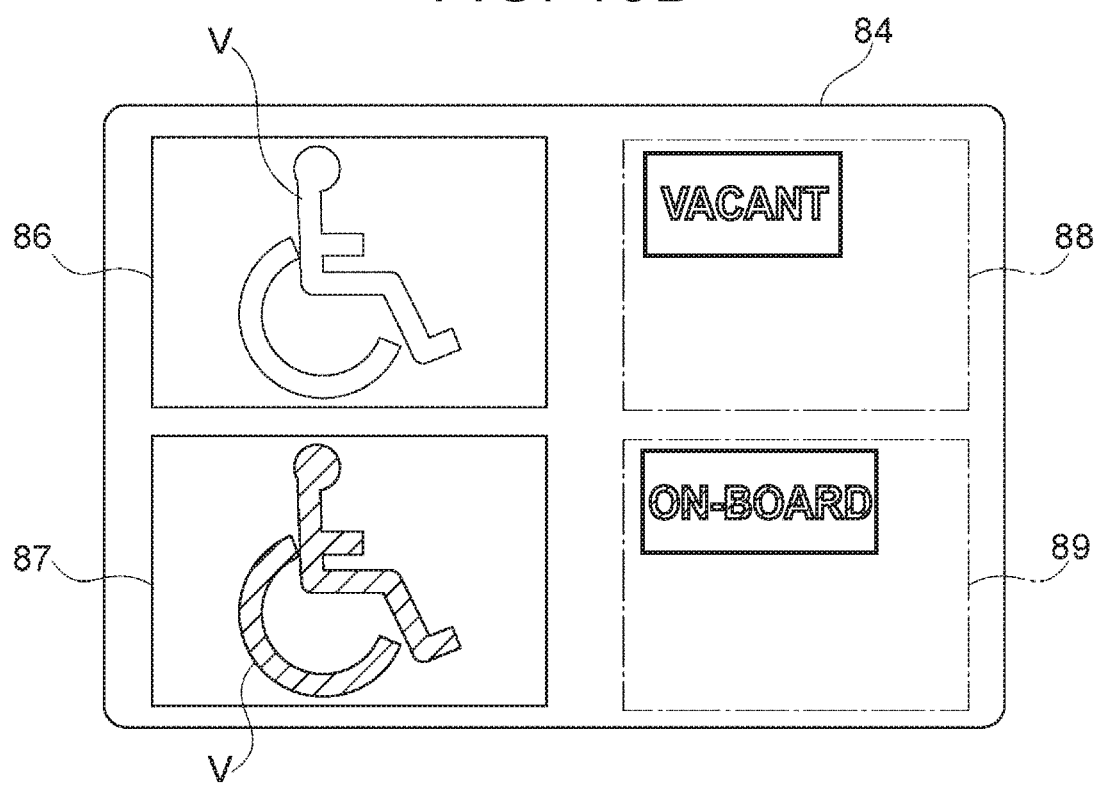
FIG. 18B is an enlarged view illustrating the outer surface display in the first embodiment in an enlarged manner and illustrates a state where the first wheelchair securing space is vacant, and the wheelchair placed in the second wheelchair securing space has been secured.

Subsequently, when the occupant P2 of the wheelchair 102 boarding in the wheelchair securing space S2 completes securing, the display on the vehicle outside display portion 84 is changed to a display illustrated in FIG. 18B. That is, the pictogram V lit in green is displayed on the front-side pictogram display portion 87, and a display indicative of on-board in green is displayed on the front-side state display portion 89. The display indicative of poor securing is turned off. By displaying the secured state of the wheelchair to the outside of the vehicle as such, a pedestrian and so on outside the vehicle can be promoted to support securing of the wheelchair in a case where the wheelchair has not been secured.

Further, in the above embodiments, an image of the wheelchair securing space S1 and the wheelchair securing space S2 is captured by one camera 18, as illustrated in FIG. 1. However, the present disclosure is not limited to this. For example, respective cameras may be disposed for the wheelchair securing space S1 and the wheelchair securing space S2. Alternatively, a sensor or the like may be placed around each wheelchair securing space so that a wheelchair may be detected by the sensor or the like.

Further, in the above embodiments, the secured state of the wheelchair, the restrained state of the occupant, and so on are determined by the camera 18. However, the present disclosure is not limited to this. For example, in FIGS. 2 and 3, a buckle sensor may be provided in the first wheelchair buckle 32. In this case, when the buckle sensor is turned on, a state where the wheelchair tongue plate 33 is attached to the first wheelchair buckle 32 is detected, so that the secured state is determined to be established. Similarly to this, in FIGS. 10 and 11, a buckle sensor may be provided in the first occupant buckle 78. In this case, when the buckle sensor is turned on, a state where the occupant tongue plate 79 is attached to the first occupant buckle 78 is detected, so that the restrained state is determined to be established.

Furthermore, in the above embodiments, the first display device 36 is placed above the wheelchair securing space S1, and the second display device 38 is placed above the wheelchair securing space S2. However, the present disclosure is not limited to this. For example, the first display device 36 may be placed on the ceiling, at a position in front of the camera 18 in the vehicle front-rear direction. Even in this case, when a display surface of the first display device 36 is placed to face the occupant P1, the first display device 36 is visually recognizable by the occupant P1 of the wheelchair 100 from the wheelchair securing space S1. Further, in comparison with the structure where the first display device 36 is placed right above the wheelchair securing space S1, the occupant P1 can check the content displayed on the first display device 36 without looking up. Further, the first display device 36 and the second display device 38 may be placed in the vehicle cabin as an integrated display device. In this case, the integrated display device is placed at a position where the integrated display device is visually recognizable by both the occupant P1 and the occupant P2.

Further, in the above embodiments, the wheelchair 100 in the wheelchair securing space S1 is placed to face forward in the vehicle front-rear direction, and the wheelchair 102 in the wheelchair securing space S2 is placed to face rearward in the vehicle front-rear direction. However, the present disclosure is not limited to this. For example, the position of the securing device 28 may be changed so that the wheelchair 100 in the wheelchair securing space S1 can be secured to face rearward in the vehicle front-rear direction. Also, the position of the securing device 28 may be changed so that the wheelchair 100 and the wheelchair 102 can be secured to face the vehicle width direction.

Further, in the above embodiments, as illustrated in FIGS. 4A-4C and 12A-12D, the secured state and the restrained state are displayed by changing at least either of the color and the shape of the pictogram V. However, the present disclosure is not limited to this. For example, the secured state and the restrained state may be displayed by changing the color of a lamp.

Furthermore, in the second embodiment, in a case where the occupant P1 is brought into the restrained state before the wheelchair 100 is secured, a display other than the displays described with reference to FIGS. 12A-12D may be performed. For example, the pictogram V may be lit in orange. Further, an announcement to promote securing of the wheelchair 100 may be performed.

Further, in the modification illustrated in FIG. 17, the vehicle outside display portion 84 is provided on the left wall of the vehicle 12. However, the present disclosure is not limited to this. For example, the vehicle outside display portion may be provided outside the vehicle, or a portable terminal carried by a user may be used as the vehicle outside display portion. In this case, when the user operates the portable terminal, the user can check on a use state of a wheelchair from a position distanced from the vehicle 12.

What is claimed is:

1. A wheelchair securing structure comprising:
    a securing device provided in a wheelchair securing space inside a vehicle cabin, the securing device being configured to secure a wheelchair;
    a securing detection portion configured to detect that the wheelchair is secured by the securing device the securing device includes a wheelchair retractor, a wheelchair buckle and a wheelchair belt member; and
    a display portion provided at a position where the display portion is visually recognizable by an occupant of the wheelchair from the wheelchair securing space inside the vehicle cabin, the display portion being configured to display a secured state of the wheelchair, the secured state being detected by the securing detection portion, wherein
    a pictogram is displayed on the display portion,
    at least either of a color and a shape of the pictogram is changed depending on whether the wheelchair is in the secured state where the wheelchair is secured or a non-secured state where the wheelchair is not secured, and
    when the wheelchair is in the non-secured state in which the wheelchair is not in the secured state and a vehicle starts running, the pictogram is flashed in a first color.

2. The wheelchair securing structure according to claim 1, wherein:
    a plurality of wheelchair securing spaces and a plurality of securing devices are provided inside the vehicle cabin; and
    the display portion is provided in each of the wheelchair securing spaces.

3. The wheelchair securing structure according to claim 1, wherein the securing detection portion detects that the wheelchair is secured, based on a camera provided in an upper part in the vehicle cabin and configured to capture an image of the wheelchair securing space.

4. The wheelchair securing structure according to claim 1, comprising a sound output portion configured to output alarm or predetermined voice inside the vehicle cabin when the wheelchair is placed in the wheelchair securing space, but the wheelchair is in the non-secured state where the wheelchair is not secured.

5. The wheelchair securing structure according to claim 1, further comprising a sound output portion which outputs an alarm or a predetermined voice, when the wheelchair is in the non-secured state in which the wheelchair is not in the secured state and the vehicle starts running.

6. The wheelchair securing structure according to claim 1, wherein when the wheelchair is in the secured state, the shape of the pictogram changes into a shape imitating a state where the wheelchair is bound by a representation of the securing device.

7. The wheelchair securing structure according to claim 1, further comprising a wheelchair detection portion configured to detect that the wheelchair is placed in the wheelchair securing space, wherein the color of the pictogram is changed depending on whether the wheelchair is in a state where the wheelchair is placed in the wheelchair securing space or in a state where the wheelchair is not placed in the wheelchair securing space.

8. The wheelchair securing structure according to claim 7, wherein, when the securing detection portion detects that the wheelchair is secured by the securing device in a state where the wheelchair detection portion does not detect that the wheelchair is placed in the wheelchair securing space, a misuse state is displayed on the display portion.

9. The wheelchair securing structure according to claim 1, wherein a vehicle outside display portion is provided on an outer surface of a vehicle body, the vehicle outside display portion being configured to display, to a user outside the vehicle, whether the wheelchair is placed in the wheelchair securing space or not.

10. The wheelchair securing structure according to claim 9, wherein the secured state of the wheelchair, the secured state being detected by the securing detection portion, is displayed on the vehicle outside display portion.

11. The wheelchair securing structure according to claim 1, further comprising:
    a restraint device provided in the wheelchair securing space, the restraint device being configured to restrain the occupant of the wheelchair to the wheelchair; and
    a restraint detection portion configured to detect that the occupant is restrained by the restraint device, wherein a restrained state of the occupant, the restrained state being detected by the restraint detection portion, is displayed on the display portion in addition to the secured state of the wheelchair, the secured state being detected by the securing detection portion.

12. The wheelchair securing structure according to claim 11, wherein:
    at least either of the color and the shape of the pictogram is changed depending on whether the occupant is in the restrained state where the occupant is restrained or a non-restrained state where the occupant is not restrained.

13. The wheelchair securing structure according to claim 12, wherein;
    when the wheelchair is in the secured state, the occupant of the wheelchair is in the non-restrained state in which the occupant is not restrained and the vehicle starts running, the pictogram is flashed in a second color which is different from the first color.

14. The wheelchair securing structure according to claim 12, wherein when the wheelchair is in the secured state and the occupant enters the restrained state, the shape of the pictogram is changed into a shape imitating a state where the wheelchair is bound by a representation of the securing device and the occupant is restrained by a representation of the restraint device.

15. The wheelchair securing structure according to claim 11, further comprising a sound output portion which outputs an alarm or an predetermined voice, when the wheelchair is in the secured state, the occupant of the wheelchair is in a non-restrained state in which the occupant is not restrained and the vehicle starts running.

16. A wheelchair securing structure comprising:
    a securing device provided in a wheelchair securing space inside a vehicle cabin, the securing device being configured to secure a wheelchair;
    a securing detection portion configured to detect that the wheelchair is secured by the securing device the securing device includes a wheelchair retractor, a wheelchair buckle and a wheelchair belt member;

a display portion provided at a position where the display portion is visually recognizable by an occupant of the wheelchair from the wheelchair securing space inside the vehicle cabin, the display portion being configured to display a secured state of the wheelchair, the secured state being detected by the securing detection portion;

a restraint device provided in the wheelchair securing space, the restraint device being configured to restrain the occupant of the wheelchair to the wheelchair; and a restraint detection portion configured to detect that the occupant is restrained by the restraint device, wherein:

a restrained state of the occupant, the restrained state being detected by the restraint detection portion, is displayed on the display portion in addition to the secured state of the wheelchair, the secured state being detected by the securing detection portion, a pictogram is displayed on the display portion, at least either of a color and a shape of the pictogram is changed depending on whether the wheelchair is in the secured state where the wheelchair is secured or a non-secured state where the wheelchair is not secured, at least either of the color and the shape of the pictogram is changed depending on whether the occupant is in the restrained state where the occupant is restrained or a non-restrained state where the occupant is not restrained, when the wheelchair is in the non-secured state in which the wheelchair is not in the secured state and a vehicle starts running, the pictogram is flashed in a first color, and when the wheelchair is in the secured state, the occupant of the wheelchair is in the non-restrained state in which the occupant is not restrained and the vehicle starts running, the pictogram is flashed in a second color which is different from the first color.

17. The wheelchair securing structure according to claim 16, wherein when the wheelchair is in the secured state, the shape of the pictogram changes into a shape imitating a state where the wheelchair is bound by a representation of the securing device.

18. The wheelchair securing structure according to claim 16, wherein when the wheelchair is in the secured state and the occupant enters the restrained state, the shape of the pictogram is changed into a shape imitating a state where the wheelchair is bound by a representation of the securing device and the occupant is restrained by a representation of the restraint device.

19. The wheelchair securing structure according to claim 16, further comprising a sound output portion which outputs an alarm or a predetermined voice, when the wheelchair is in the non-secured state in which the wheelchair is not in the secured state and the vehicle starts running.

* * * * *